United States Patent
Zou et al.

(10) Patent No.: US 10,457,844 B2
(45) Date of Patent: Oct. 29, 2019

(54) HEAT TRANSFER METHODS, SYSTEMS AND COMPOSITIONS

(71) Applicant: HONEYWELL INTERNATIONAL INC., Morris Plains, NY (US)

(72) Inventors: Yang Zou, Buffalo, NY (US); Samuel F. Yana Motta, East Amherst, NY (US); Gustavo Pottker, Getzville, NY (US); Ankit Sethi, Buffalo, NY (US); Elizabet del Carmen Vera Becerra, Amherst, NY (US); Henna Tangri, Williamsville, NY (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 15/971,648

(22) Filed: May 4, 2018

(65) Prior Publication Data

US 2018/0320041 A1  Nov. 8, 2018

Related U.S. Application Data

(60) Provisional application No. 62/502,406, filed on May 5, 2017.

(51) Int. Cl.

| C09K 5/04 | (2006.01) |
|---|---|
| F25B 31/00 | (2006.01) |
| F25B 9/00 | (2006.01) |
| F25B 45/00 | (2006.01) |
| F25B 1/00 | (2006.01) |

(52) U.S. Cl.
CPC .............. *C09K 5/045* (2013.01); *C09K 5/044* (2013.01); *F25B 9/006* (2013.01); *F25B 31/002* (2013.01); *C09K 2205/106* (2013.01); *C09K 2205/122* (2013.01); *F25B 1/00* (2013.01); *F25B 45/00* (2013.01)

(58) Field of Classification Search
CPC .... C09K 5/044; C09K 5/045; C09K 2205/24; C10M 111/04; C10M 171/008; C10M 107/32; C10M 107/28; C10M 169/04; C10M 105/38; C10M 2223/041; C10M 2217/0245; C10M 2209/043; C10M 2207/2835; C10M 2207/282; C10M 2207/042; C10M 2207/026; C10M 2205/0206; C10N 2240/30; C10N 2230/10; C10N 2230/06; C10N 2220/302; C10N 2220/022; C10N 2220/021; F25B 2500/16
USPC ..................................................... 252/67, 68
See application file for complete search history.

(56) References Cited

U.S. PATENT DOCUMENTS

| 7,465,698 | B2* | 12/2008 | Wilson | C08J 9/143 |
|---|---|---|---|---|
| | | | | 510/408 |
| 8,070,355 | B2* | 12/2011 | Minor | C09K 5/045 |
| | | | | 374/4 |
| 2006/0033071 | A1* | 2/2006 | Wilson | C09K 3/30 |
| | | | | 252/67 |
| 2008/0111099 | A1* | 5/2008 | Singh | C09K 5/045 |
| | | | | 252/67 |
| 2008/0121837 | A1* | 5/2008 | Singh | C09K 5/045 |
| | | | | 252/67 |
| 2008/0157022 | A1* | 7/2008 | Singh | C09K 5/045 |
| | | | | 252/68 |
| 2008/0230738 | A1* | 9/2008 | Minor | A62D 1/0057 |
| | | | | 252/67 |
| 2010/0044619 | A1* | 2/2010 | Hulse | C09K 3/30 |
| | | | | 252/67 |
| 2013/0200295 | A1* | 8/2013 | Rebrovic | C09K 5/045 |
| | | | | 252/68 |
| 2016/0130490 | A1* | 5/2016 | Kujak | C09K 5/045 |
| | | | | 62/77 |
| 2017/0137682 | A1* | 5/2017 | Hulse | C09K 5/045 |
| 2018/0079941 | A1* | 3/2018 | Ueno | C09K 5/04 |
| 2019/0085224 | A1* | 3/2019 | Sethi | C09K 5/045 |
| 2019/0161660 | A1* | 5/2019 | Yana Motta | C09K 5/044 |

FOREIGN PATENT DOCUMENTS

WO    WO-2018204860 A1 * 11/2018 ............. C09K 5/045

* cited by examiner

*Primary Examiner* — Douglas J McGinty
(74) *Attorney, Agent, or Firm* — Colleen D. Szuch

(57) ABSTRACT

Disclosed are heat transfer compositions and methods and systems containing refrigerants consisting essentially of difluoromethane (HFC-32), and trifluoroiodomethane (CF3I), and heat transfer compositions and methods and systems containing refrigerants consisting essentially of difluoromethane (HFC-32), and trifluoroiodomethane (CF3I) and CO2.

20 Claims, 4 Drawing Sheets

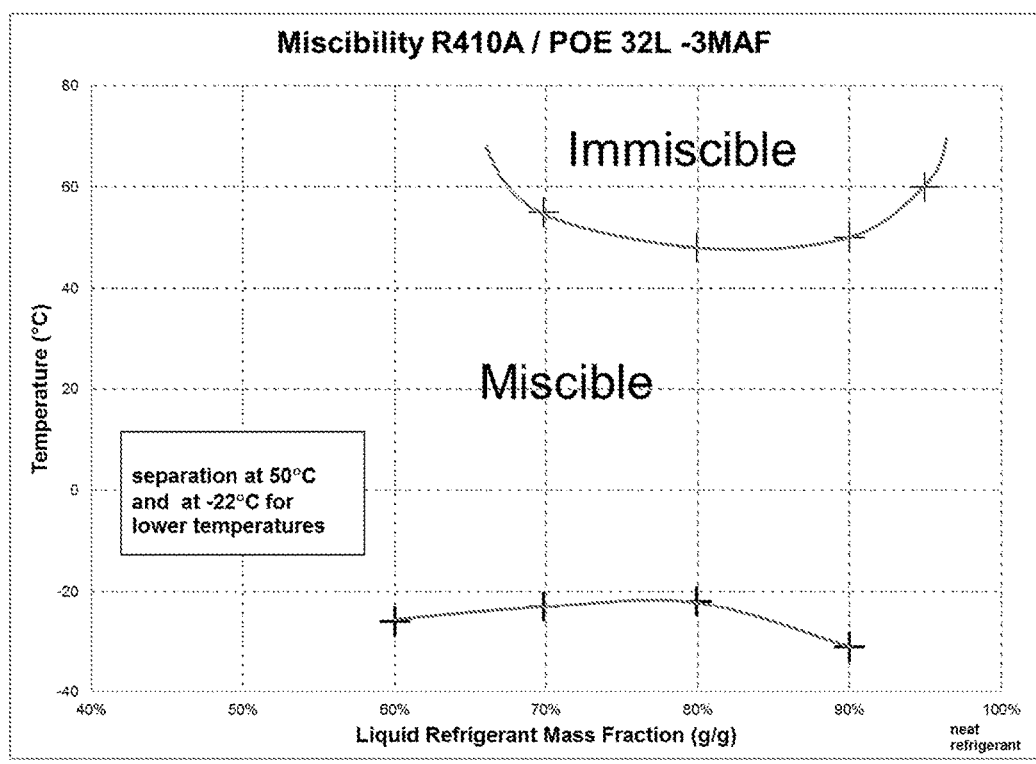
Figure 1: R410A Miscibility with POE-32 Oil

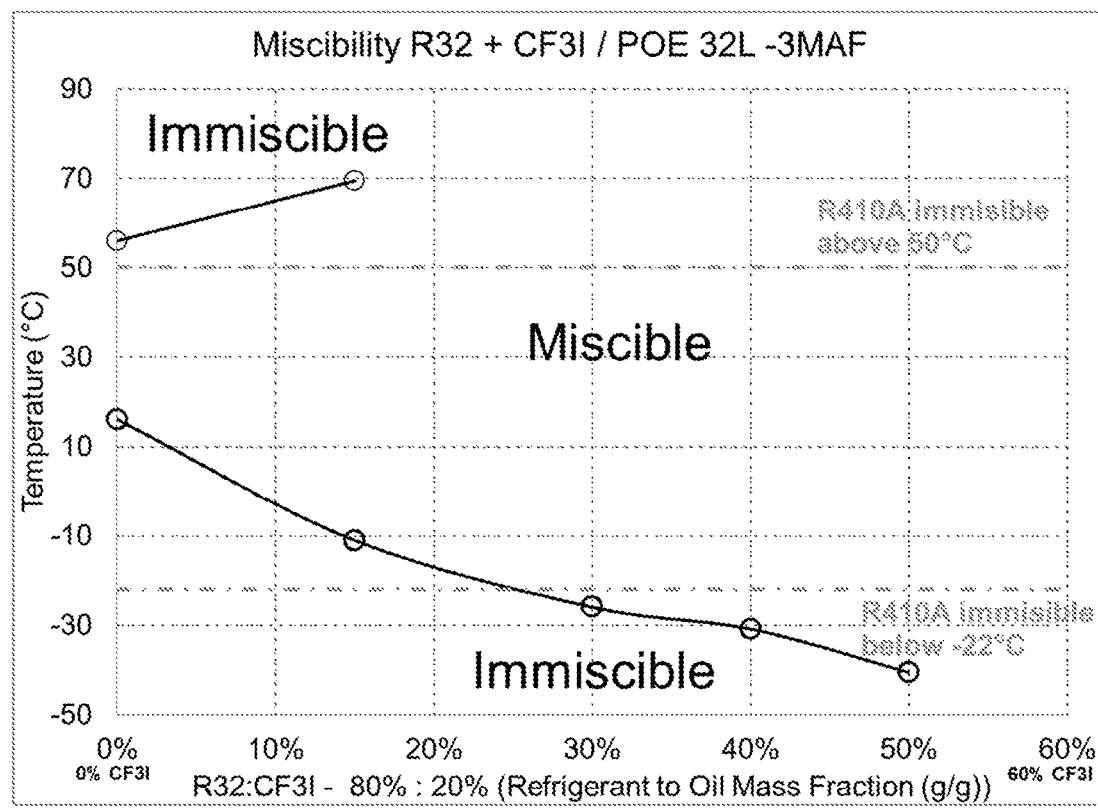
Figure 2: Miscibility of blends of R32 + CF$_3$I with POE-32 Oil

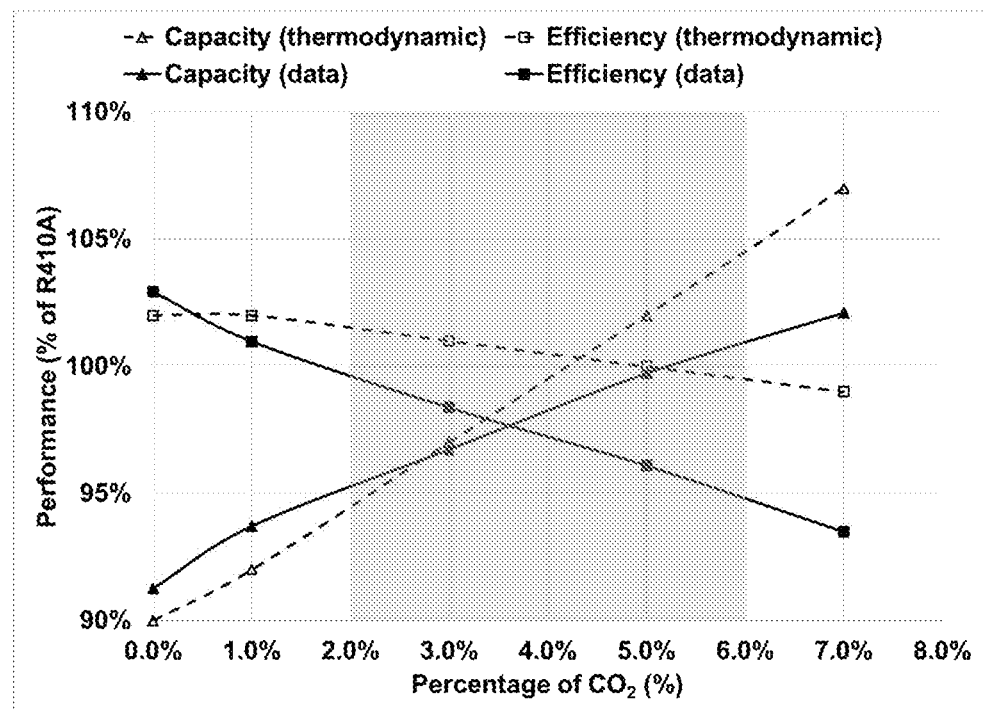
Figure 3: TXV system capacity and efficiency

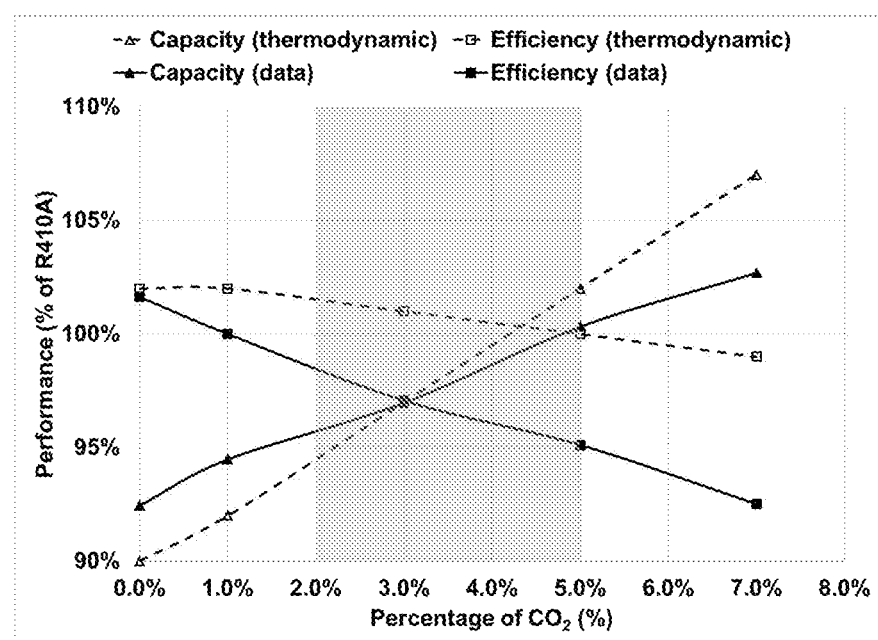
Figure 4: Capillary tube system capacity and efficiency

HEAT TRANSFER METHODS, SYSTEMS AND COMPOSITIONS

CROSS REFERENCE TO RELATED APPLICATION

The present application claims the priority of U.S. Provisional Application No. 62/502,406, filed May 5, 2017, the entirety of which is herein incorporated by reference.

FIELD OF THE INVENTION

The present invention relates to compositions, methods and systems having utility in heat exchange systems, including heat pump, air conditioning and refrigeration applications and in particular aspects to compositions in heat transfer systems of the type in which the refrigerant R-410A would have been used, that is for replacement of the refrigerant R-410A for heating and cooling applications and to retrofitting heat exchange systems, including systems designed for use with R-410A.

BACKGROUND

Mechanical refrigeration systems, and related heat transfer devices, such as heat pumps and air conditioners, using refrigerant liquids are well known in the art for industrial, commercial and domestic uses. Chlorofluorocarbons (CFCs) were developed in the 1930s as refrigerants for such systems. However, since the 1980s, the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs).

One of the most commonly used hydrochlorofluorocarbon refrigerants was chlorodifluoromethane (HCFC-22). However, subsequent amendments to the Montreal protocol accelerated the phase out of the CFCs and also scheduled the phase-out of HCFCs, including HCFC-22.

In response to the requirement for a non-flammable, non-toxic alternative to the CFCs and HCFCs, industry has developed a number of hydrofluorocarbons (HFCs) which have zero ozone depletion potential. R-410A (a 50:50 w/w blend of difluoromethane (HFC-32) and pentafluoroethane (HFC-125)) was adopted as the industry replacement for HCFC-22 in air conditioning and chiller applications as it does not contribute to ozone depletion. However, R-410A is not a drop-in replacement for R22. Thus, the replacement of R-22 with R-410A required the redesign of major components within heat exchange systems, including the replacement and redesign of the compressor to accommodate the higher operating pressure and volumetric capacity of R-410A, when compared with R-22.

While R-410A has a more acceptable Ozone Depleting Potential (ODP) than R-22, the continued use of R-410A is problematic, due to its high Global Warming Potential of 2088. There is therefore a need in the art for the replacement of R-410A with a more environmentally acceptable alternative.

It is understood in the art that it is highly desirable for any replacement heat transfer fluid to possess a mosaic of properties including excellent heat transfer properties, and in particular heat transfer properties that are well matched to the needs of the particular application, chemical stability, low or no toxicity, non-flammability, lubricant compatibility and/or lubricant miscibility amongst others. In addition, any replacement for R-410A would ideally be a good match for the operating conditions of R-410A in order to avoid modification or redesign of the system. The identification of a heat transfer fluid meeting all of these requirements, many of which are unpredictable, is is a significant challenge.

With regard to efficiency and use, it is important to note that a loss of refrigerant thermodynamic performance or energy efficiency may result in an increase in fossil fuel usage as a result of the increased demand for electrical energy. The use of such a refrigerant will therefore have a negative secondary environmental impact.

Flammability is considered to be an important, and in some cases, a critical property for many heat transfer applications Thus, it is frequently beneficial to use compounds in such compositions to achieve, if possible a refrigerant, which is non-flammable. As used herein, the term "non-flammable" refers to compounds or compositions which are determined to be non-flammable in accordance with ASTM standard E-681-2001 at conditions described in ASHRAE Standard 34-2013 and described in Appendix B1 to ASHRAE Standard 34-2013.

It is critical for maintenance of system efficiency, and proper and reliable functioning of the compressor, that lubricant circulating in a vapour compression heat transfer system is returned to the compressor to perform its intended lubricating function. Otherwise, lubricant might accumulate and become lodged in the coils and piping of the system, including in the heat transfer components. Furthermore, when lubricant accumulates on the inner surfaces of the evaporator, it lowers the heat exchange efficiency of the evaporator, and thereby reduces the efficiency of the system.

R410A is currently used with polyol ester (POE) lubricating oil in air conditioning applications, as R410A is miscible with POE at temperatures experienced during use of such systems. However, R410A is immiscible with POE at temperatures typically experienced during operation of low temperature refrigeration systems, and heat pump systems. Therefore, unless steps are taken to mitigate against this immiscibility, POE and R410A cannot be used in low temperature refrigeration or heat pump systems.

It is therefore desirable to be able to use compositions which are capable of being used as a replacement for R410A in heat pump and low temperature refrigeration systems, but which do not suffer the drawback of immiscibility with POE at temperatures experienced during operation of these systems.

SUMMARY

The present invention provides a refrigerant composition which can be used as replacements for R-410A and which exhibit the desired mosaic of properties of excellent heat transfer properties, chemical stability, low or no toxicity, non-flammability, lubricant compatibility and/or lubricant miscibility in combination with an acceptable Global Warming Potential (GWP) and near zero ODP.

The present invention also includes refrigerants consisting essentially of:
about 38% by weight difluoromethane (HFC-32),
from 57% to 59% by weight trifluoroiodomethane (CF3I); and
from 2% to 5% by weight of $CO_2$. The refrigerant according to this paragraph is sometimes referred to herein for convenience as Refrigerant 1.

The present invention also includes refrigerants consisting essentially of:
about 38% by weight difluoromethane (HFC-32),
from 57% to 59% by weight trifluoroiodomethane (CF3I); and from 2% to 5% by weight of CO2, wherein the refrigerant in non-flammable. The refrigerant according to this paragraph is sometimes referred to herein for convenience as Refrigerant 2.

The present invention also includes refrigerants consisting of:
about 38% by weight difluoromethane (HFC-32),
from 57% to 59% by weight trifluoroiodomethane (CF3I); and
from 2% to 5% by weight of CO2. The refrigerant according to this paragraph is sometimes referred to herein for convenience as Refrigerant 3.

The present invention also includes refrigerants consisting of:
about 38% by weight difluoromethane (HFC-32),
from 57% to 59% by weight trifluoroiodomethane (CF3I); and
from 2% to 5% by weight of CO2, wherein the refrigerant in non-flammable. The refrigerant according to this paragraph is sometimes referred to herein for convenience as Refrigerant 4.

The present invention also includes refrigerants consisting essentially of:
about 38% by weight difluoromethane (HFC-32),
from 58%+/−0.5% to 59%+/−0.5% by weight trifluoroiodomethane (CF3I); and
from 2% to 3.5% by weight of CO2. The refrigerant according to this paragraph is sometimes referred to herein for convenience as Refrigerant 5.

The present invention also includes refrigerants consisting of:
about 38% by weight difluoromethane (HFC-32),
from 58%+/−0.5% to 59%+/−0.5% by weight trifluoroiodomethane (CF3I); and
from 2% to 3.5% by weight of CO2. The refrigerant according to this paragraph is sometimes referred to herein for convenience as Refrigerant 6.

The present invention also includes refrigerants consisting essentially of:
38%+/−0.5% by weight difluoromethane (HFC-32),
59%+/−0.5% by weight trifluoroiodomethane (CF3I); and
3%+/−0.5% by weight of CO2. The refrigerant according to this paragraph is sometimes referred to herein for convenience as Refrigerant 7.

The present invention also includes refrigerants consisting of:
38%+/−0.5% by weight difluoromethane (HFC-32),
59%+/−0.5% by weight trifluoroiodomethane (CF3I); and
3%+/−0.5% by weight of CO2. The refrigerant according to this paragraph is sometimes referred to herein for convenience as Refrigerant 8.

The present invention includes refrigerants consisting essentially of:
from about 34% by weight to about 38% by weight difluoromethane (HFC-32), and
from about 62% by weight to about 66% by weight trifluoroiodomethane (CF$_3$I). The refrigerant according to this paragraph is sometimes referred to herein for convenience as Refrigerant 9.

The present invention includes refrigerants consisting essentially of:
from about 34% by weight to about 38% by weight difluoromethane (HFC-32), and
from about 62% by weight to about 66% by weight trifluoroiodomethane (CF3I), wherein the refrigerant in non-flammable. The refrigerant according to this paragraph is sometimes referred to herein for convenience as Refrigerant 10.

Preferably, the refrigerant consists of:
from about 34% by weight to about 38% by weight difluoromethane (HFC-32), and
from about 62% by weight to about 66% by weight trifluoroiodomethane (CF$_3$I). The refrigerant according to this paragraph is sometimes referred to herein for convenience as Refrigerant 11.

According to the present invention, there is provided a refrigerant consisting essentially of:
about 36% by weight difluoromethane (HFC-32), and
about 64% by weight trifluoroiodomethane (CF$_3$I). The refrigerant according to this paragraph is sometimes referred to herein for convenience as Refrigerant 12.

Preferably, the refrigerant consists of:
about 36% by weight difluoromethane (HFC-32), and
about 64% by weight trifluoroiodomethane (CF$_3$I). The refrigerant according to this paragraph is sometimes referred to herein for convenience as Refrigerant 13.

It will be appreciated that the term "consists of" means that the refrigerant contains the three components HFC-32and CF$_3$I in the indicated amounts and excludes the presence of other components in amounts greater than trace or contamination levels.

As used herein with respect to weight percentages, the term "about" with respect to an amount of an identified component means the amount of the identified component can vary by an amount of +/−1% by weight. The refrigerants and compositions of the invention include in preferred embodiments amounts of an identified compound or component specified as being "about" wherein the amount is the identified amount +/−0.5% by weight, or +/−0.3% by weight.

BRIEF DESCRIPTION OF THE FIGURE

FIG. 1 is a miscibility chart illustrating the results of Example 7.

FIG. 2 is a miscibility chart illustrating the results of Example 7.

FIG. 3 is a miscibility chart illustrating the results of Example 10.

FIG. 4 is a miscibility chart illustrating the results of Example 13.

DETAILED DESCRIPTION

Applicants have found that the refrigerants of the present invention, including Refrigerants 1-13 as described herein, are capable of providing exceptionally advantageous properties and in particular non-flammability, especially with the use of the refrigerant of the present invention as a replacement for R-410A.

A particular advantage of the refrigerants of the present invention is that they are non-flammable when tested in accordance with ASTM E681-2009 test procedure as required in ASHRAE Standard 34-2013 and described in Appendix B1 to ASHRAE Standard 34-2013. Flammability is defined as the ability of a composition to ignite and/or propagate a flame. It will be appreciated by the skilled person that the flammability of a refrigerant is an important characteristic for use in many commercially important heat transfer applications. Thus, it is a desire in the art to provide a refrigerant composition which can be used as a replacement for R-410A which has excellent heat transfer properties, chemical stability, low or no toxicity, lubricant compatibility and/or lubricant miscibility and which maintains non flammability in use. This requirement is met by the refrigerants of the present invention.

Each of the refrigerants of the present invention, including Refrigerants 1-13, can be incorporated into a heat transfer composition. Thus, the invention further relates to a heat transfer composition comprising a refrigerant a refrigerant of the present invention, including each of Refrigerants 1-13.

Preferably, the heat transfer composition comprises any of the refrigerants of the present invention, including Refrigerants 1-13, in an amount of greater than about 40% by weight of the heat transfer composition or greater than about 50% by weight of the heat transfer composition, or greater than about 70% by weight of the heat transfer composition, or greater than about 80% by weight of the heat transfer composition or greater than about 90% by weight of the heat transfer composition, or greater than about 95% by weight of the heat transfer composition, or greater than about 97.5% by weight of the heat transfer composition. The heat transfer composition may consist essentially of the refrigerant.

The heat transfer composition of the invention may include other components for the purpose of enhancing or providing certain functionality to the composition. Such other components or additives may include one or more of lubricants, dyes, solubilizing agents, compatibilizers, stabilizers, antioxidants, corrosion inhibitors, extreme pressure additives and anti wear additives.

Stabilizers

The heat transfer composition of the invention particularly comprises any of the refrigerants as discussed herein, including Refrigerants 1-13, and a stabilizer. Examples of preferred stabilizers include diene-based compounds and/or phenol-based compounds and/or phosphorus compounds and/or nitrogen compounds and/or epoxides selected from the group consisting of aromatic epoxides, alkyl epoxides, alkyenyl epoxides.

The diene-based compounds include C3 to C15 dienes and to compounds formed by reaction of any two or more C3 to C4 dienes. Preferably, the diene based compounds are selected from the group consisting of allyl ethers, propadiene, butadiene, isoprene and terpenes. The diene-based compounds are preferably terpenes, which include but are not limited to terebene, retinal, geranoil, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$. Preferably, the stabilizer is farnesene.

Preferred terpene stabilizers are disclosed in U.S. Provisional Patent Application No. 60/638,003 filed on Dec. 12, 2004, which is incorporated herein by reference.

The stabilizer preferably is provided in the heat transfer composition in an amount of greater than 0 and preferably from 0.0001% by weight to about 5% by weight, preferably 0.01% by weight to about 2% by weight, and more preferably from 0.1 to about 1% by weight. In each case, percentage by weight refers to the weight of the heat transfer composition.

The stabilizer preferably is provided in the heat transfer composition in an amount of greater than 0 and preferably from 0.0001% by weight to about 5% by weight, preferably 0.01% by weight to about 2% by weight, and more preferably from 0.1 to about 1% by weight. In each case, percentage by weight refers to the weight of the heat transfer composition.

The diene based compounds can be provided in the heat transfer composition in an amount of from about 0.001% by weight to about 5% by weight, preferably about 0.01% by weight to about 2% by weight, more preferably from about 0.1 to 1% by weight. In each case, by weight refers to the weight of the heat transfer composition.

The diene based compounds are preferably provided in combination with a phosphorous compound.

The phosphorus compound can be a phosphite or a phosphate compound. For the purposes of this invention, the phosphite compound can be a diaryl, dialkyl, triaryl and/or trialkyl phosphite, in particular one or more compounds selected from hindered phosphites, tris-(di-tert-butylphenyl) phosphite, di-n-octyl phosphite, iso-decyl diphenyl phosphite and diphenyl phosphite, particularly diphenyl phosphite.

The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of from about 0.001% by weight to about 5% by weight, preferably about 0.01% by weight to about 2% by weight, more preferably from about 0.1 to 1% by weight. In each case, by weight refers to weight of the heat transfer composition.

Thus, the heat transfer composition of the invention comprises any of the refrigerants of the present invention, including Refrigerants 1-13, and a stabilizer composition comprising a terpene and a phosphorus compound selected from a phosphate or a phosphite, particularly, a stabilizer composition comprising a terpene and a phosphite. For the purposes of convenience, a stabilizer comprising a terpene and a phosphorus compound selected from a phosphate or a phosphite is sometimes referred to for convenience herein as Stabilizer 1. For the purposes of convenience, a stabilizer comprising a terpene and a phosphite is sometimes referred to for convenience herein as Stabilizer 1A.

The heat transfer composition of the invention can preferably comprise Refrigerant 1 and Stabilizer 1 or Stabilizer 1A.

The heat transfer composition of the invention can preferably comprise Refrigerant 2 and Stabilizer 1 or Stabilizer 1A.

The heat transfer composition of the invention can preferably comprise Refrigerant 3 and Stabilizer 1 or Stabilizer 1A.

The heat transfer composition of the invention can preferably comprise Refrigerant 4 and Stabilizer 1 or Stabilizer 1A.

The heat transfer composition of the invention can preferably comprise Refrigerant 5 and Stabilizer 1 or Stabilizer 1A.

The heat transfer composition of the invention can preferably comprise Refrigerant 6 and Stabilizer 1 or Stabilizer 1A.

The heat transfer composition of the invention can preferably comprise Refrigerant 7 and Stabilizer 1 or Stabilizer 1A.

The heat transfer composition of the invention can preferably comprise Refrigerant 8 and Stabilizer 1 or Stabilizer 1A.

The heat transfer composition of the invention can preferably comprise Refrigerant 9 and Stabilizer 1 or Stabilizer 1A.

The heat transfer composition of the invention can preferably comprise Refrigerant 10 and Stabilizer 1 or Stabilizer 1A.

The heat transfer composition of the invention can preferably comprise Refrigerant 11 and Stabilizer 1 or Stabilizer 1A.

The heat transfer composition of the invention can preferably comprise Refrigerant 12 and Stabilizer 1 or Stabilizer 1A.

The heat transfer composition of the invention can preferably comprise Refrigerant 13 and Stabilizer 1 or Stabilizer 1A.

Preferably, the heat transfer composition comprises a refrigerant as described herein, including Refrigerants 1-13 and a stabilizer composition comprising farnesene and a phosphorous compound selected from a diaryl phosphite, a dialkyl phosphite, a triaryl phosphate or a trialkyl phosphate, more preferably diphenyl phosphite and/or tri-n-butyl phosphate. More preferably the heat transfer composition comprises a refrigerant as described herein and a stabilizer composition comprising farnesene and one or more of a diaryl phosphite or a dialkyl phosphite, more preferably diphenyl phosphite.

Alternatively or in addition, the stabilizer is a nitrogen compound. For the purposes of this invention, the nitrogen compound can be one or more compounds selected from dinitrobenzene, nitrobenzene, nitromethane, nitrosobenzene, and TEMPO [(2,2,6,6-tetramethylpiperidin-1-yl)oxyl]. Preferably, the stabilizer is dinitrobenzene.

Alternatively or in addition, the nitrogen compound is an amine based compound. For the purposes of this invention, the amine based compound can be one or more secondary or tertiary amines selected from diphenylamine, p-phenylenediamine, triethylamine, tributylamine, diisopropylamine, triisopropylamine and triisobutylamine. For the purposes of this invention, the amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc). For the purposes of this invention, the amine based compound can be an alkyldiphenyl amine such as bis (nonylphenyl amine) or a dialkylamine such as (N-(1-methylethyl)-2-propylamine. Alternatively or in addition, the nitrogen compound can be phenyl-alpha-naphthyl amine (PANA), alkyl-phenyl-alpha-naphthyl-amine (APANA) or bis(nonylphenyl)amine. Preferably, the nitrogen compound is selected from phenyl-alpha-naphthyl amine (PANA), alkyl-phenyl-alpha-naphthyl-amine (APANA) and bis(nonylphenyl)amine.

The nitrogen compounds can be provided in the heat transfer composition in an amount of from about 0.001% by weight to about 5% by weight, preferably about 0.01% by weight to about 2% by weight, more preferably from about 0.1 to 1% by weight. In each case, by weight refers to weight of the heat transfer composition.

Thus, the heat transfer composition of the invention may comprise any of the refrigerants according to the present invention, including Refrigerants 1-13, and a stabilizer composition comprising a nitrogen compound selected from dinitrobenzene, nitrobenzene, nitromethane, nitrosobenzene, and TEMPO [(2,2,6,6-tetramethylpiperidin-1-yl)oxyl], a secondary or tertiary amine selected from diphenylamine, p-phenylenediamine, triethylamine, tributylamine, diisopropylamine, triisopropylamine and triisobutylamine; an amine antioxidant such as a substituted piperidine compound, i.e. a derivative of an alkyl substituted piperidyl, piperidinyl, piperazinone, or alkyoxypiperidinyl, selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin® 765 (Ciba), BLS® 1944 (Mayzo Inc) and BLS® 1770 (Mayzo Inc); an alkyldiphenyl amine such as bis (nonylphenyl amine), a dialkylamine such as (N-(1-methylethyl)-2-propylamine; phenyl-alpha-naphthyl amine (PANA), alkyl-phenyl-alpha-naphthyl-amine (APANA) or bis(nonylphenyl)amine. Preferably, the nitrogen compound is selected from phenyl-alpha-naphthyl amine (PANA), alkyl-phenyl-alpha-naphthyl-amine (APANA) and bis(nonylphenyl)amine.

Alternatively or in addition, the stabilizer can comprise a phenol, preferably a hindered phenol. For the purposes of this invention, the phenol can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol; 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone. Preferably the phenol compound is BHT.

The phenol compounds can be provided in the heat transfer composition in an amount of from about 0.001% by weight to about 5% by weight, preferably about 0.01% by weight to about 2% by weight, more preferably from about 0.1 to 1% by weight. In each case, by weight refers to weight of the heat transfer composition.

BHT can be provided in the heat transfer composition in an amount of from about 0.001% by weight to about 5% by weight, preferably about 0.01% by weight to about 2% by weight, more preferably from about 0.1 to 1% by weight. In each case, by weight refers to weight of the heat transfer composition. BHT in an amount of from about 0.0001% by weight to about 5% by weight based on the weight of the heat transfer composition is sometimes referred to for convenience as Stabilizer 2.

The heat transfer composition of the invention can preferably comprise Refrigerant 1 and Stabilizer 2.

The heat transfer composition of the invention can preferably comprise Refrigerant 2 and Stabilizer 2.

The heat transfer composition of the invention can preferably comprise Refrigerant 3 and Stabilizer 2.

The heat transfer composition of the invention can preferably comprise Refrigerant 4 and Stabilizer 2.

The heat transfer composition of the invention can preferably comprise Refrigerant 5 and Stabilizer 2.

The heat transfer composition of the invention can preferably comprise Refrigerant 6 and Stabilizer 2.

The heat transfer composition of the invention can preferably comprise Refrigerant 7 and Stabilizer 2.

The heat transfer composition of the invention can preferably comprise Refrigerant 8 and Stabilizer 2.

The heat transfer composition of the invention can preferably comprise Refrigerant 9 and Stabilizer 2.

The heat transfer composition of the invention can preferably comprise Refrigerant 10 and Stabilizer 2.

The heat transfer composition of the invention can preferably comprise Refrigerant 11 and Stabilizer 2.

The heat transfer composition of the invention can preferably comprise Refrigerant 12 and Stabilizer 2.

The heat transfer composition of the invention can preferably comprise Refrigerant 13 and Stabilizer 2

Each of the heat transfer compositions of the invention as defined above may additionally comprise a lubricant. In general, the heat transfer composition comprises a lubricant, in amounts of from about 10 to about 60% by weight of the heat transfer composition, preferably from about 20 to about 50% by weight of the heat transfer composition, alternatively about 20 to about 40% by weight of the heat transfer composition, alternatively about 20 to about 30% by weight of the heat transfer composition, alternatively about 30 to about 50% by weight of the heat transfer composition, alternatively about 30 to about 40% by weight of the heat transfer composition, alternatively from about 1 to about 10% by weight of the heat transfer composition, alternatively from about 1 to about 8% by weight of the heat transfer composition, alternatively from about 1 to about 5% by weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs) and poly(alpha-olefin) (PAO) may be used with any of the refrigerant compositions of the present invention, including Refrigerants 1-13.

However, it is particularly preferred that the lubricant is a polyol ester. It has surprisingly discovered that the inventive compositions are miscible with POE lubricants across a wide range of temperatures, e.g. temperatures of from about −50° C. to +70° C. This allows the inventive compositions to be used in a wider variety of heat transfer applications than R410A. For example, the inventive compositions may be used in refrigeration, air conditioning and heat pump applications.

The term "about", in relation to temperatures means that the stated temperature can vary by an amount of +/−5° C., preferably by an amount of +/−2° C. and more preferably by an amount of +/−1° C., most preferably by an amount of +/−0.5° C.

Thus, the present invention provides a heat transfer composition comprising a lubricant and a refrigerant according to any of the refrigerants of the present invention, including Refrigerants 1-13, wherein when 5 wt %, 20 wt % and/or 50 wt % of lubricant relative to the total amount of refrigerant and lubricant is added to the refrigerant, the mixture has one liquid phase at at least one temperature in the range of from about −25 to about −50° C. and/or in the range of from about +50. to about +70° C.

Thus, the present invention provides a heat transfer composition comprising a POE lubricant and a refrigerant according to any of the refrigerants of the present invention, including Refrigerants 1-13, wherein when 5 wt %, 20 wt % and/or 50 wt % of lubricant relative to the total amount of refrigerant and lubricant is added to the refrigerant, the mixture has one liquid phase at at least one temperature in the range of from about −25 to about −50° C. and/or in the range of from about +50° C. to about +70° C.

The lubricant may also comprise, consist essentially of or consist of a mineral oil lubricant. Commercially available mineral oils include Witco LP 250 (registered trademark) from Witco, Suniso 3GS from Witco and Calumet R015 from Calumet.

The lubricant may also comprise, consist essentially of or consist of an alkylbenzene lubricant. Commercially available alkylbenzene lubricants include Zerol 150 (registered trademark) and Zerol 300 (registered trademark) from Shrieve Chemical.

The lubricant may also comprise, consist essentially of or consist of an ester lubricant. Commercially available esters include neopentile glycol dipelargomate which is available as Emery 2917 (registered trademark) and Hatcol 2370 (registered trademark). Other useful esters include phosphate esters, di-basic acid esters and fluoro esters.

For the purposes of this invention, the heat transfer composition can comprise a refrigerant according to the present invention, including any of Refrigerants 1-13, and a stabilizer composition as disclosed herein, including any of Stabilizer 1, Stabilizer 1A or Stabilizer 2, and a lubricant selected from polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), most preferably from polyol esters (POEs).

In preferred embodiments, the lubricant is a synthetic polyol ester (POE) lubricant that has a viscosity at 40 C (cSt) as measured by ASTM D445 according to refrigeration industry practice of from about 25 to about 50, more preferably from about 30 to about 50 and preferably also a viscosity at 100 C (cSt) as measured by ASTM D445 according to accepted refrigeration industry standards according to refrigeration industry standards of from about 0 to about 15, more preferably from about 5 to about 10. A commercial product that is consistent with the preferred POE as described in his paragraph is the commercial lubricant sold by Lubrizol under the trade designation Emkarate RL 3203MAF). Lubricants consistent with the description of this paragraph are referred to herein as Lubricant 1.

Where the compositions of the invention are provided for use in mobile air conditioning, the lubricant is preferably a polyalkylene glycol lubricant. Alternatively, when the compositions of the invention are provided for refrigeration applications, stationary air conditioning applications, or heat pump applications, the lubricant is preferably a polyol ester, an alkyl benzene or a mineral oil, more preferably a polyol ester. For systems and methods in which the heat transfer compositions of the present invention, including those heat transfer compositions containing any refrigerant of the present invention, including any of Refrigerants 1-13, are provided for or used with a lubricant in refrigeration applications, stationary air conditioning applications, or heat pump applications, the lubricant is preferably a polyol ester, more preferably Lubricant 1.

A preferred heat transfer composition comprises Refrigerant 2 and Lubricant 1.

A preferred heat transfer composition comprises Refrigerant 3 and Lubricant 1.

A preferred heat transfer composition comprises Refrigerant 4 and Lubricant 1.

A preferred heat transfer composition comprises Refrigerant 5 and Lubricant 1.

A preferred heat transfer composition comprises Refrigerant 6 and Lubricant 1

A preferred heat transfer composition comprises Refrigerant 7 and Lubricant 1.

A preferred heat transfer composition comprises Refrigerant 8 and Lubricant 1.

A preferred heat transfer composition comprises Refrigerant 9 and Lubricant 1.

A preferred heat transfer composition comprises Refrigerant 10 and Lubricant 1.

A preferred heat transfer composition comprises Refrigerant 11 and Lubricant 1.

A preferred heat transfer composition comprises Refrigerant 12 and Lubricant 1.

A preferred heat transfer composition comprises Refrigerant 13 and Lubricant 1.

The heat transfer composition of the invention may consist essentially of or consist of any of the refrigerants of the present invention, including any of Refrigerants 1-13, any of the stabilizer compositions as described herein, including Stabilizers 1, 1A and 2, and any of the lubricants as described herein, including Lubricant 1.

Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference.

The applicants have found that the compositions of the invention are capable of achieving a difficult to achieve combination of properties including particularly low GWP. Thus, the compositions of the invention have a Global Warming Potential (GWP) of not greater than about 500, preferably not greater than about 300 In a particularly preferred feature of the invention, the composition of the invention has a Global Warming Potential (GWP) of not greater than about 300.

In addition, the compositions of the invention have a low Ozone Depletion Potential (ODP). Thus the compositions of the invention have an Ozone Depletion Potential (ODP) of not greater than about 0.05, preferably not greater than about 0.02, more preferably about zero.

In addition the compositions of the invention show acceptable toxicity and preferably have an Occupational Exposure Limit (OEL) of greater than about 400.

The compositions disclosed herein are provided for use in heat transfer applications, including air conditioning, refrigeration and heat pumps.

Any reference to the heat transfer composition of the invention refers to each and any of the heat transfer compositions as described herein, including all heat transfer compositions that include any of the refrigerants of the present invention, including any of Refrigerants 1-13. Thus, for the following discussion of the uses or applications of the composition of the invention, the heat transfer composition may comprise or consist essentially of a refrigerant of the present invention, including any of Refrigerants 1-13, in combination with any of the lubricants described herein, including particularly POE and Lubricant 1 and/or in combination with any of the stabilizers as described herein, including any of Stabilizers 1, 1A or 2.

For the purposes of this invention, each and any of the heat transfer compositions as described herein can be used in a heat transfer system, such as an air conditioning system, a refrigeration system or a heat pump. The heat transfer system according to the present invention can comprise a compressor, an evaporator, a condenser, an expansion device, in communication with each other.

The present invention therefore includes the use of a heat transfer composition comprising Refrigerant 1, in an aft conditioning system.

The present invention therefore includes the use of a heat transfer composition comprising Refrigerant 2, in an aft conditioning system.

The present invention therefore includes the use of a heat transfer composition comprising Refrigerant 3, in an aft conditioning system.

The present invention therefore includes the use of a heat transfer composition comprising Refrigerant 4, in an aft conditioning system.

The present invention therefore includes the use of a heat transfer composition comprising Refrigerant 5, in an aft conditioning system.

The present invention therefore includes the use of a heat transfer composition comprising Refrigerant 6, in an aft conditioning system.

The present invention therefore includes the use of a heat transfer composition comprising Refrigerant 7, in an aft conditioning system.

The present invention therefore includes the use of a heat transfer composition comprising Refrigerant 8, in an aft conditioning system.

The present invention therefore includes the use of a heat transfer composition comprising Refrigerant 9, in an aft conditioning system.

The present invention therefore includes the use of a heat transfer composition comprising Refrigerant 10, in an air conditioning system.

The present invention therefore includes the use of a heat transfer composition comprising Refrigerant 11, in an air conditioning system.

The present invention therefore includes the use of a heat transfer composition comprising Refrigerant 12, in an air conditioning system.

The present invention therefore includes the use of a heat transfer composition comprising Refrigerant 13, in an air conditioning system.

The present invention therefore includes the use of a heat transfer composition comprising Refrigerant 1, in a refrigeration system.

The present invention therefore includes the use of a heat transfer composition comprising Refrigerant 2, in a refrigeration system.

The present invention therefore includes the use of a heat transfer composition comprising Refrigerant 3, in a refrigeration system.

The present invention therefore includes the use of a heat transfer composition comprising Refrigerant 4, in a refrigeration system.

The present invention therefore includes the use of a heat transfer composition comprising Refrigerant 5, in a refrigeration system.

The present invention therefore includes the use of a heat transfer composition comprising Refrigerant 6, in a refrigeration system.

The present invention therefore includes the use of a heat transfer composition comprising Refrigerant 7, in a refrigeration system.

The present invention therefore includes the use of a heat transfer composition comprising Refrigerant 8, in a refrigeration system.

The present invention therefore includes the use of a heat transfer composition comprising Refrigerant 9, in a refrigeration system.

The present invention therefore includes the use of a heat transfer composition comprising Refrigerant 10, in a refrigeration system.

The present invention therefore includes the use of a heat transfer composition comprising Refrigerant 11, a refrigeration system.

The present invention therefore includes the use of a heat transfer composition comprising Refrigerant 12, in a refrigeration system.

The present invention therefore includes the use of a heat transfer composition comprising Refrigerant 13, in a refrigeration system.

The present invention therefore includes the use of a heat transfer composition comprising Refrigerant 1, in a heat pump system.

The present invention therefore includes the use of a heat transfer composition comprising Refrigerant 2, in a heat pump system.

The present invention therefore includes the use of a heat transfer composition comprising Refrigerant 3, in a heat pump system.

The present invention therefore includes the use of a heat transfer composition comprising Refrigerant 4, in a heat pump system.

The present invention therefore includes the use of a heat transfer composition comprising Refrigerant 5, in a heat pump system.

The present invention therefore includes the use of a heat transfer composition comprising Refrigerant 6, in a heat pump system.

The present invention therefore includes the use of a heat transfer composition comprising Refrigerant 7, in a heat pump system.

The present invention therefore includes the use of a heat transfer composition comprising Refrigerant 8, in a heat pump system.

The present invention therefore includes the use of a heat transfer composition comprising Refrigerant 9, in a heat pump system.

The present invention therefore includes the use of a heat transfer composition comprising Refrigerant 10, in a heat pump system.

The present invention therefore includes the use of a heat transfer composition comprising Refrigerant 11, a heat pump system.

The present invention therefore includes the use of a heat transfer composition comprising Refrigerant 12, in a heat pump system.

The present invention therefore includes the use of a heat transfer composition comprising Refrigerant 13, in a heat pump system.

Examples of commonly used compressors, for the purposes of this invention include reciprocating, rotary (including rolling piston and rotary vane), scroll, screw, and centrifugal compressors. Thus, the present invention provides each and any of the heat transfer compositions as described herein, including any of the heat transfer compositions that comprise any of Refrigerants 1-13, for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of the heat transfer compositions as described herein, including any of the heat transfer compositions that comprise any of Refrigerants 1-13, for use in a heat transfer system comprising a capillary tube, a fixed orifice, a thermal expansion valve or an electronic expansion valve.

For the purposes of this invention, the evaporator and the condenser together form a heat exchanger, preferably selected from a finned tube heat exchanger, a microchannel heat exchanger, a shell and tube, a plate heat exchanger, and a tube-in-tube heat exchanger. Thus, the present invention provides each and any of the heat transfer compositions as described herein, including any of the heat transfer compositions that comprise any of Refrigerants 1-13, for use in a heat transfer system wherein the evaporator and condenser together form a finned tube heat exchanger, a microchannel heat exchanger, a shell and tube, a plate heat exchanger, or a tube-in-tube heat exchanger.

The heat transfer composition of the invention can be used in heating and cooling applications.

In a particular feature of the invention, the heat transfer composition, including any of the heat transfer compositions that comprise any of Refrigerants 1-13, can be used in a method of cooling comprising condensing a refrigerant of the present invention, including any of Refrigerants 1-13, and subsequently evaporating said refrigerant in the vicinity of an article or body to be cooled.

Thus, the invention relates to a method of cooling in a heat transfer system comprising an evaporator, a condenser and a compressor, the process comprising the steps of i) condensing refrigerant of the present invention, including any of Refrigerants 1-13, and ii) evaporating the refrigerant in the vicinity of body or article to be cooled;

wherein the evaporating temperature of the refrigerant is in the range of from about −40° C. to about +10° C., wherein the refrigerant is optionally but preferably in an admixture with a stabilizer as described herein, including Stabilizer 1, 1A or 2, and optionally an preferably in admixture with a lubricant, including POE and Lubricant 1.

Alternatively or in addition, any of the heat transfer compositions of the present invention, including those heat transfer compositions comprising any of Refrigerants 1-13, can be used in a method of heating comprising condensing a refrigerant of the present invention, including any of Refrigerants 1-13, in the vicinity of an article or body to be heated and subsequently evaporating said refrigerant.

Thus, the invention relates to a method of heating in a heat transfer system comprising an evaporator, a condenser and a compressor, the process comprising the steps of i) condensing a refrigerant of the present invention, including any of Refrigerants 1-13, in the vicinity of a body or article to be heated, and ii) evaporating the refrigerant;

wherein the evaporator temperature of the heat transfer system is in the range of about −30° C. to about 5° C., wherein the refrigerant is optionally but preferably in an admixture with a stabilizer as described herein, including Stabilizer 1, 1A or 2, and optionally an preferably in admixture with a lubricant, including POE and Lubricant 1.

The heat transfer compositions of the invention are provided for use in air conditioning applications including both mobile and stationary air conditioning applications. The heat transfer compositions of the invention may also be used in heat pump applications. Thus, any of the heat transfer compositions described herein, including any of the heat transfer compositions of the present invention, including those heat transfer compositions comprising any of Refrigerants 1-13, can be used in any one of:
- an air conditioning application including mobile air conditioning, particularly automobile air conditioning,
- a mobile heat pump, particularly an electric vehicle heat pump
- a chiller, particularly a positive displacement chiller, more particularly air-cooled or water-cooled direct expansion chiller, modular or conventionally singularly packaged
- a residential air conditioning system, particularly a ducted split and a ductless split air conditioning systems
- a residential heat pump,
- a residential air to water heat pump/hydronic system,
- an industrial air conditioning system and
- an commercial air conditioning system, particularly a packaged rooftop unit and a variable refrigerant flow (VRF) system
- a commercial air-source, water-source or ground-source heat pump system.

The heat transfer compositions of the invention, including any of the heat transfer compositions of the present invention, including those heat transfer compositions comprising any of Refrigerants 1-13, are provided for use in a refrigeration system. The term "refrigeration system" refers to any system or apparatus or any part or portion of such a system or apparatus which employs a refrigerant to provide cooling. Thus, any of the heat transfer compositions described herein, including any of the heat transfer compositions comprising any of Refrigerants 1-13, can be used in any one of:
- a low temperature refrigeration system,
- a medium temperature refrigeration system,
- a commercial refrigerator,
- a commercial freezer,
- an ice machine,
- a vending machine,
- a transport refrigeration system,
- a domestic freezer,
- a domestic refrigerator,
- an industrial freezer,
- an industrial refrigerator and
- a chiller.

Each of the heat transfer compositions described herein, including those heat transfer compositions comprising any of Refrigerants 1-13, is particularly provided for use in a residential air-conditioning system (with an evaporator temperature in the range of about 0 to about 10° C., particularly about 7° C. for cooling and/or in the range of about −30 to about 5° C., particularly about 0.5° C. for heating), particular an air conditioning system with a reciprocating, rotary (rolling-piston or rotary vane) or scroll compressor.

Each of the heat transfer compositions described herein, including those heat transfer compositions comprising any of Refrigerants 1-13, is particularly provided for use in an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor.

Each of the heat transfer compositions described herein, including those heat transfer compositions comprising any of Refrigerants 1-13, is particularly provided for use in a residential air to water heat pump hydronic system (with an evaporator temperature in the range of about −30 to about 5° C., particularly about 0.5° C.).

Each of the heat transfer compositions described herein, including those heat transfer compositions comprising any of Refrigerants 1-13, is particularly provided for use in a medium temperature refrigeration system (with an evaporator temperature in the range of about −12 to about 0° C., particularly about −8° C.).

Each of the heat transfer compositions described herein, including those heat transfer compositions comprising any of Refrigerants 1-13, is particularly provided for use in a low temperature refrigeration system (with an evaporator temperature in the range of about −40 to about −12° C., particularly about −23° C.).

Thus, the heat transfer composition of the invention, including those heat transfer compositions comprising any of Refrigerants 1-13, is provided for use in a residential air conditioning system, wherein the residential air-conditioning system is used to supply cool air (said air having a temperature of for example, about 10° C. to about 17° C., particularly about 12° C.) to buildings for example, in the summer. Typical system types are ducted split, ductless split, window, and portable air-conditioning system. The system usually has an air-to-refrigerant evaporator (indoor coil), a compressor, an air-to-refrigerant condenser (outdoor coil), and an expansion device. The evaporator and condenser are usually a finned tube or microchannel heat exchanger. The compressor is usually a reciprocating or rotary (rolling-piston or rotary vane) or scroll compressor. The expansion device is usually a capillary tube, a thermal or electronic expansion valve. The refrigerant evaporating temperature is preferably in the range of 0° C. to 10° C. The refrigerant condensing temperature is preferably in the range of 40° C. to 70° C.

The heat transfer composition of the invention, including those heat transfer compositions comprising any of Refrigerants 1-13, is provided for use in a residential heat pump system, wherein the residential heat pump system is used to supply warm air (said air having a temperature of for example, about 18° C. to about 24° C., particularly about 21° C.) to buildings in the winter. It is usually the same system as the residential air-conditioning system, while in the heat pump mode the refrigerant flow is reversed and the indoor coil becomes condenser and the outdoor coil becomes evaporator. Typical system types are ducted split and ductless split heat pump system. The evaporator and condenser are usually a finned tube or microchannel heat exchanger. The compressor is usually a reciprocating or rotary (rolling-piston or rotary vane) or scroll compressor. The expansion device is usually a capillary tube, a thermal or electronic expansion valve. The refrigerant evaporating temperature is preferably in the range of about −30° C. to about 5° C. The refrigerant condensing temperature is preferably in the range of about 35° C. to about 50° C.

The heat transfer composition of the invention, including those heat transfer compositions comprising any of Refrigerants 1-13, is provided for use in a commercial air-conditioning system wherein the commercial air conditioning system can be a chiller which is used to supply chilled water (said water having a temperature of for example about 7° C.) to large buildings such as offices and hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses, and a thermal or electronic expansion valve. The refrigerant evaporating temperature is preferably in the range of about 0° C. to about 10° C. The condensing temperature is preferably in the range of about 40° C. to about 70° C.

The heat transfer composition of the invention, including those heat transfer compositions comprising any of Refrigerants 1-13, is provided for use in a residential air-to-water heat pump hydronic system, wherein the residential air-to-water heat pump hydronic system is used to supply hot water (said water having a temperature of for example about 55° C.) to buildings for floor heating or similar applications in the winter. The hydronic system usually has a finned tube or microchannel evaporator to exchange heat with ambient air, a reciprocating, rotary or scroll compressor, a plate, tube-in-tube or shell-and-tube condenser to heat the water, and a thermal or electronic expansion valve. The refrigerant evaporating temperature is preferably in the range of about −30° C. to about 5° C. The condensing temperature is preferably in the range of about 50° C. to about 90° C.

The heat transfer composition of the invention, including those heat transfer compositions comprising any of Refrigerants 1-13, is provided for use in a medium temperature refrigeration system, wherein the medium temperature refrigeration system is preferably used to chill food or beverages such as in a refrigerator or a bottle cooler. The system usually has an air-to-refrigerant evaporator to chill the food or beverage, a reciprocating, scroll or screw compressor, an air-to-refrigerant condenser to exchange heat with the ambient air, and a thermal or electronic expansion valve. The refrigerant evaporating temperature is preferably in the range of about −12° C. to about 0° C. The condensing temperature is preferably in the range of about 20° C. to about 70° C.

The heat transfer composition of the invention, including those heat transfer compositions comprising any of Refrigerants 1-13, is provided for use in a low temperature refrigeration system, wherein said low temperature refrigeration system is preferably used in a freezer or an ice cream machine. The system usually has an air-to-refrigerant evaporator, a reciprocating, scroll or screw compressor, an air-to-refrigerant condenser to exchange heat with the ambient air, and a thermal or electronic expansion valve. The refrigerant evaporating temperature is preferably in the range of about −40° C. to about −12° C. The condensing temperature is preferably in the range of about 20° C. to about 70° C.

The heat transfer composition disclosed herein, including those heat transfer compositions comprising any of Refrigerants 1-13, is provided as a low Global Warming (GWP) replacement for the refrigerant R-410A. The heat transfer composition, including those heat transfer compositions comprising any of Refrigerants 1-13, therefore can be used in a method of retrofitting an existing heat transfer system designed to contain or containing R-410A refrigerant, without requiring substantial engineering modification of the existing system, particularly without modification of the condenser, the evaporator and/or the expansion valve.

As the term is used herein, "retrofit" with respect to a particular heat transfer composition or refrigerant of the present invention means the use of the indicated composition of the present invention in a heat transfer system that had contained therein a different refrigerant composition that is or had been at least partially removed from the system and into which the indicated composition of the present invention is introduced.

As the term is used herein, "replacement" with respect to a particular heat transfer composition or refrigerant of the present invention as a "replacement" for a particular prior refrigerant means the use of the indicated composition of the present invention in a heat transfer system that heretofore had been commonly used with that prior refrigerant. By way of example, the heat transfer systems that have heretofore been commonly used with R410A include residential air conditioning systems and chiller systems.

Alternatively, the heat transfer composition, including those heat transfer compositions comprising any of Refrigerants 1-13, can be used in a method of retrofitting an existing heat transfer system designed to contain or containing R410A refrigerant, wherein the system is modified for the refrigerant of the invention.

Alternatively, the heat transfer composition, including those heat transfer compositions comprising any of Refrigerants 1-13, can be used in a heat transfer system which is suitable for use with R410A refrigerant.

The present invention thus also includes methods of using a refrigerant or heat transfer composition of the present invention, including those heat transfer compositions comprising any of Refrigerants 1-13, as a replacement for R-410A, and in particular as a replacement for R-410A in residential air conditioning refrigerant, without requiring substantial engineering modification of the existing system, particularly without modification of the condenser, the evaporator and/or the expansion valve.

The present invention thus also includes methods of using a refrigerant or heat transfer composition of the present invention, including those heat transfer compositions comprising any of Refrigerants 1-13, as a replacement for R-410A, and in particular as a replacement for R-410A in a refrigeration system, without requiring substantial engineering modification of the existing system, particularly without modification of the condenser, the evaporator and/or the expansion valve.

The present invention thus also includes methods of using a refrigerant or heat transfer composition of the present invention, including those heat transfer compositions comprising any of Refrigerants 1-13, as a replacement for R-410A, and in particular as a replacement for R-410A in a heat pump, without requiring substantial engineering modification of the existing system, particularly without modification of the condenser, the evaporator and/or the expansion valve.

It will be appreciated that when the heat transfer composition of the present invention, including those heat transfer compositions comprising any of Refrigerants 1-13, is used as a low Global Warming replacement for R-410A or is used in a method of retrofitting an existing heat transfer system designed to contain or containing R410A refrigerant or is used in a heat transfer system which is suitable for use with R410A refrigerant, the heat transfer composition may consist essentially of the refrigerant of the invention. Alternatively, the invention encompasses the use of the refrigerant of the invention including any of Refrigerants 1-13, as a low Global Warming replacement for R-410A or the use in a method of retrofitting an existing heat transfer system designed to contain or containing R410A refrigerant or the use in a heat transfer system which is suitable for use with R410A refrigerant as described herein.

It will be appreciated by the skilled person that when the heat transfer composition is provided for use in a method of retrofitting an existing heat transfer system as described above, the heat transfer composition may comprise any refrigerant of the present invention, including any of Refrigerants 1-13

The heat transfer composition provided for use in a method of retrofitting an existing heat transfer composition, including those heat transfer compositions comprising any of Refrigerants 1-13, preferably further comprises any stabilizer composition as described herein, including any of Stabilizers 1, 1A or 2.

Thus, the present invention relates to a method of replacing an existing refrigerant contained in a heat transfer system comprising removing at least a portion of said existing refrigerant from said system, said existing refrigerant being R-410A and replacing at least a portion of said existing refrigerant by introducing into said system, a refrigerant according the present invention, including any of Refrigerants 1-13, preferably in combination with a stabilizer composition as described herein, including any of Stabilizers 1, 1A or 2.

As set out above, the method comprises removing at least a portion of the existing R-410A refrigerant from the system. Preferably, the method comprises removing at least about 5%, about 10%, about 25%, about 50% or about 75% by weight of the R-410A from the system and replacing it with a heat transfer compositions of the invention, including those heat transfer compositions comprising any of Refrigerants 1-13, preferably further comprising any stabilizer composition as described herein, including any of Stabilizers 1, 1A or 2.

The refrigerants of the present invention, including any of Refrigerants 1-13, may be employed in systems which are used or are suitable for use with R-410A refrigerant, such as existing or new heat transfer systems.

The refrigerants of the present invention, including any of Refrigerants 1-13, exhibit many of the desirable characteristics of R-410A but have a GWP that is substantially lower than that of R-410A while at the same time having operating characteristics i.e. efficiency (COP), that are substantially similar to or substantially match, and preferably are as high as or higher than R-410A. This allows the refrigerants of the present invention, including any of Refrigerants 1-13, to replace R410A in existing heat transfer systems without requiring any significant system modification for example of the condenser, the evaporator and/or the expansion valve. The refrigerants of the present invention, including any of Refrigerants 1-13, can therefore be used as a direct replacement in retrofitting heat exchange systems which have been used with or are suitable for use with R410A. It may be desirable when replacing R410A with refrigerants of the present invention, including any of Refrigerants 1-13, to replace the existing compressor with a larger compressor.

The compositions of the invention may be employed as a replacement in systems which are used with or are suitable for use with R-410A refrigerant, such as existing or new heat transfer systems.

The refrigerant compositions of the present invention, including any of Refrigerants 1-13, therefore preferably exhibit operating characteristics compared with R410A wherein:

the efficiency (COP) of the composition is from 95 to 105% of the efficiency of R410A.

in heat transfer systems, in which the refrigerants of the invention are to replace the R410A refrigerant.

The term "COP" is a measure of energy efficiency and means the ratio of refrigeration or cooling capacity to the energy requirement of the refrigeration system, i.e. the energy to run the compressor, fans, etc. COP is the useful output of the refrigeration system, in this case the refrigeration capacity or how much cooling is provided, divided by how power it takes to get this output. Essentially, it is a measure of the efficiency of the system.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature.

The term "mass flow rate" is the amount "in pounds" of refrigerant passing through a conduit of a given size in a given amount of time.

In order to maintain reliability of the heat transfer system, it is preferred that the refrigerant compositions of the present invention, including any of Refrigerants 1-13, further exhibits the following characteristics compared with R-410A:

the discharge temperature is not greater than 10° C. higher than that of R-410A in heat transfer systems, in which the composition of the invention is used to replace the R-410A refrigerant.

It will be appreciated that R410A is an azeotrope-like composition. Thus, in order for the refrigerant compositions of the present invention, including any of Refrigerants 1-13, to be a good match for the operating characteristics of R410A, the compositions desirably show a low level of glide. Thus, the refrigerant compositions of the present invention, including any of Refrigerants 1-13, may provide an evaporator glide of about 7° C. or less, preferably less than about 5° C.

The existing heat transfer compositions used with R-410A are preferably air conditioning heat transfer systems including both mobile and stationary air conditioning systems. Thus, each of the heat transfer compositions as described herein, including those heat transfer compositions comprising any of Refrigerants 1-13, preferably further comprising any stabilizer composition as described herein, including any of Stabilizers 1, 1A or 2, can be used to replace R-410A in any one of:

an air conditioning system including a mobile air conditioning system, particularly an automobile air conditioning system, a mobile heat pump, particularly an electric vehicle heat pump a chiller, particularly a positive displacement chiller, more particularly air-cooled or water-cooled direct expansion chiller, modular or conventionally singularly packaged a residential air conditioning system, particularly a ducted split and a ductless split air conditioning systems a residential heat pump, a residential air to water heat pump/hydronic system, an industrial air conditioning system and an commercial air conditioning system, particularly a packaged rooftop unit and a variable refrigerant flow (VRF) system a commercial air-source, water-source or ground-source heat pump system.

The refrigerant compositions of the present invention, including any of Refrigerants 1-13, are alternatively provided to replace R410A in refrigeration systems. Thus, each of the heat transfer compositions as described herein, including those heat transfer compositions comprising any of Refrigerants 1-13, preferably further comprising any stabilizer composition as described herein, including any of Stabilizers 1, 1A or 2, can be used to replace R410A in in any one of:

a low temperature refrigeration system,
a medium temperature refrigeration system,
a commercial refrigerator,
a commercial freezer,
an ice machine,
a vending machine,
a transport refrigeration system,
a domestic freezer,
a domestic refrigerator,
an industrial freezer,
an industrial refrigerator and
a chiller.

Each of the heat transfer compositions described herein, including those heat transfer compositions comprising any of Refrigerants 1-13, preferably further comprising any stabilizer composition as described herein, including any of Stabilizers 1, 1A or 2, is particularly provided to replace R410A in a residential air-conditioning system (with an evaporator temperature in the range of about 0° C. to about 10° C., particularly about 7° C. for cooling and/or in the range of about −30° C. to about 5° C., particularly about 0.5° C. for heating). Alternatively or additionally, each of the heat transfer compositions described herein, including those heat transfer compositions comprising any of Refrigerants 1-13, preferably further comprising any stabilizer composition as described herein, including any of Stabilizers 1, 1A or 2, is particularly provided to replace R410A in a residential air conditioning system with a reciprocating, rotary (rolling-piston or rotary vane) or scroll compressor.

Each of the heat transfer compositions described herein, including those heat transfer compositions comprising any of Refrigerants 1-13, preferably further comprising any stabilizer composition as described herein, including any of Stabilizers 1, 1A or 2, is particularly provided to replace R410A in an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor.

Each of the heat transfer compositions described herein, including those heat transfer compositions comprising any of Refrigerants 1-13, preferably further comprising any stabilizer composition as described herein, including any of Stabilizers 1, 1A or 2, is particularly provided to replace R410A in a residential air to water heat pump hydronic system (with an evaporator temperature in the range of about −30 to about 5° C., particularly about 0.5° C.).

Each of the heat transfer compositions described herein, including those heat transfer compositions comprising any of Refrigerants 1-13, preferably further comprising any stabilizer composition as described herein, including any of Stabilizers 1, 1A or 2, is particularly provided to replace R410A in a medium temperature refrigeration system (with an evaporator temperature in the range of about −12 to about 0° C., particularly about −8° C.).

Each of the heat transfer compositions described herein, including those heat transfer compositions comprising any of Refrigerants 1-13, preferably further comprising any stabilizer composition as described herein, including any of Stabilizers 1, 1A or 2, is particularly provided to replace R410A in a low temperature refrigeration system (with an evaporator temperature in the range of about −40 to about −12° C., particularly about −23° C.).

The invention further provides a heat transfer system comprising a compressor, a condenser and an evaporator in fluid communication, and a heat transfer composition in said system, said heat transfer composition comprising a refrigerant, including any of Refrigerants 1-13, preferably further comprising any stabilizer composition as described herein, including any of Stabilizers 1, 1A or 2, said condenser having an operating temperature of from −20° C. to 10° C. and said evaporator having an operating temperature of from 40° C. to 70° C.

Preferably, there is provided a heat transfer system comprising a compressor, a condenser and an evaporator in fluid communication, and a heat transfer composition in said system, said heat transfer composition comprising: a refrigerant according the present invention, including any of Refrigerants 1-13, preferably further comprising any stabilizer composition as described herein, including any of Stabilizers 1, 1A or 2, said evaporator having an operating temperature of from −40° C. to +10° C. and said condenser having an operating temperature of from +20° C. to +70° C.

The heat transfer system is preferably a heat pump or an air conditioning system such as a mobile air conditioning system, particularly an automobile air conditioning system, a mobile heat pump, particularly an electric vehicle heat pump, a chiller, particularly a positive displacement chiller, more particularly air-cooled or water-cooled direct expansion chiller, modular or conventionally singularly packaged, a residential air conditioning system, particularly a ducted split and a ductless split air conditioning system, a residential heat pump, a residential air to water heat pump/hydronic system, an industrial air conditioning systems, a commercial air conditioning system, particularly a packaged rooftop and a variable refrigerant flow (VRF) system, and a commercial air-source, water-source or ground-source heat pump system Particularly, the heat transfer system is a residential air-conditioning system (with an evaporator temperature in the range of about 0 to about 10° C., particularly about 7° C. for cooling and/or in the range of about −30 to about 5° C., particularly about 0.5° C. for heating), particular an air conditioning system with a reciprocating, rotary (rolling-piston or rotary vane) or scroll compressor.

Particularly, the heat transfer system is an air cooled chiller (with an evaporator temperature in the range of about 0 to about 10° C., particularly about 4.5° C.), particularly an air cooled chiller with a positive displacement compressor, more particular an air cooled chiller with a reciprocating or scroll compressor.

Particularly, the heat transfer system is a residential air to water heat pump hydronic system (with an evaporator temperature in the range of about −30 to about 5° C., particularly about 0.5° C.).

The heat transfer system can be a refrigeration system, such as a low temperature refrigeration system, a medium temperature refrigeration system, a commercial refrigerator, a commercial freezer, an ice machine, a vending machine, a transport refrigeration system, a domestic freezer, a domestic refrigerator, an industrial freezer, an industrial refrigerator and a chiller.

Particularly, the heat transfer system is a medium temperature refrigeration system (with an evaporator temperature in the range of about −12 to about 0° C., particularly about −8° C.).

Particularly, the heat transfer system is a low temperature refrigeration system (with an evaporator temperature in the range of about −40 to about −12° C., particularly about −23° C.).

The ability of the refrigerant compositions of this invention to provide a desirable and unexpected match to the operating conditions of R-410A is illustrated by the following non-limiting examples:

EXAMPLES

R32/CF3I

The R-32/CF3I binary refrigerant compositions identified in Table 1 below were determined as described herein. Each composition was subjected to thermodynamic analysis to determine its ability to match the operating characteristics of R-4104A in various refrigeration systems. The analysis was performed using experimental data collected for properties of various binary pairs of components used in the composition. The composition of each binary pair was varied over a series of relative percentages in the experimental evaluation and the mixture parameters for each binary pair were regressed to the experimentally obtained data. The assumptions used to conduct the analysis were the following: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 1

Refrigerant evaluated for Performance Examples

| Refrigerant | R32 (wt %) | CF3I (wt %) |
|---|---|---|
| A1 | 38 | 62 |
| A2 | 36 | 64 |
| A3 | 34 | 66 |

TABLE 2

Properties of Refrigerant A1 to A3

| Refrigerant | R32 (wt %) | CF3I (wt %) | GWP | COP (% R410A) | Evap Glide (° C.) | Flammability |
|---|---|---|---|---|---|---|
| A1 (HDR139) | 38% | 62% | 257 | 102% | 5.2 | Non Flammable |
| A2 (HDR140) | 36% | 64% | 244 | 102% | 5.9 | Non Flammable |
| A3 | 34% | 66% | 230 | 102% | 6.7 | Non Flammable |

Example 1

Residential Air-Conditioning System (Cooling)

Description:

Residential air-conditioning systems are used to supply cool air (about 12° C.) to buildings in the summer. Typical system types are ducted split, ductless split, window and portable air-conditioning system. The system usually has an air-to-refrigerant evaporator (indoor coil), a compressor, an air-to-refrigerant condenser (outdoor coil), and an expansion device. The evaporator and condenser are usually finned tube or microchannel heat exchangers. The compressor is usually reciprocating, rotary (rolling-piston or rotary vane) or scroll compressor. The expansion device is usually a capillary tube, a thermal or electronic expansion valve. The refrigerant evaporating temperature is in the range of about 0 to about 10° C., while the condensing temperature is in the range of about 40 to about 70° C.

Operating Conditions:

1. Condensing temperature=46° C., Corresponding outdoor ambient temperature=35° C.
2. Condenser sub-cooling=5.5° C.
3. Evaporating temperature=7° C., Corresponding indoor ambient temperature=26.7° C.
4. Evaporator Superheat=5.5° C.
5. Isentropic Efficiency=70%
6. Volumetric Efficiency=100%
7. Temperature Rise in Suction Line=5.5° C.

TABLE 3

Performance in Residential Air-Conditioning System (Cooling)

| Refrigerant | Capacity (% R410A) | Efficiency (% R410A) | Pressure ratio (% R410A) | Discharge Pressure (% R410A) | Discharge Temperature Difference (° C.) | Evap Glide (° C.) |
|---|---|---|---|---|---|---|
| R410A | 100% | 100% | 100% | 100% | 0 | 0.1 |
| A1 | 89% | 102% | 100% | 86% | 12.1 | 5.2 |
| A2 | 87% | 102% | 100% | 84% | 12.3 | 5.9 |
| A3 | 85% | 102% | 101% | 83% | 12.5 | 6.7 |

Table 3 shows the thermodynamic performance of a residential air-conditioning system compared to R410A system.

Composition A1 to A3 show 85% or higher capacity and matched efficiency compared to R410A. these data indicate the system performance is similar to R410A.

Composition A1 to A3 show 100% or 101% pressure ratio compared to R410A. It indicates the compressor efficiencies are similar to R410A, and no changes on R410A compressor are needed.

Composition A1 to A3 show evaporator glide less than 7° C.

Example 2

Residential Heat Pump System (Heating)

Description:

Residential heat pump systems are used to supply warm air (about 21° C.) to buildings in the winter. It is usually the same system as the residential air-conditioning system, however, when the system in the heat pump mode the refrigerant flow is reversed and the indoor coil becomes condenser and the outdoor coil becomes evaporator. Typical system types are ducted split and ductless split heat pump system. The evaporator and condenser are usually finned tube or microchannel heat exchangers. The compressor is usually reciprocating or rotary (rolling-piston or rotary vane) or scroll compressor. The expansion device is usually a capillary tube, a thermal or electronic expansion valve. The refrigerant evaporating temperature is in the range of about −30 to about 5° C., while the condensing temperature is in the range of about 35 to about 50° C.

Operating Conditions:
1. Condensing temperature=41° C., Corresponding indoor ambient temperature=21.1° C.
2. Condenser sub-cooling=5.5° C.
3. Evaporating temperature=0.5° C., Corresponding outdoor ambient temperature=8.3° C.
4. Evaporator Superheat=5.5° C.
5. Isentropic Efficiency=70%
6. Volumetric Efficiency=100%
7. Temperature Rise in Suction Line=5.5° C.

Table 4 shows the thermodynamic performance of a residential heat pump system compared to R410A system.

Composition A1 to A3 show 85% or higher capacity (considering ±3% uncertainty) and matched efficiency compared to R410A. these data indicate the system performance is similar to R410A.

Composition A1 to A3 show 100% or 101% pressure ratio compared to R410A. It indicates the compressor efficiencies are similar to R410A, and no changes on R410A compressor are needed.

Composition A1 to A3 show evaporator glide less than 7° C.

Example 3

Commercial Air-Conditioning System—Air-Cooled Chiller

Description:

Commercial air-conditioning systems (chillers) are used to supply chilled water (about 7° C.) to large buildings such as offices, hospitals, etc. Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a round tube plate fin or microchannel condenser to exchange heat with ambient air, and a thermal or electronic expansion valve. The water-cooled system usually has a shell-and-tube evaporator to supply chilled water, a reciprocating or scroll compressor, a shell-and-tube condenser to exchange heat with water from cooling tower or lake, sea and other natural recourses, and a thermal or electronic expansion valve. The refrigerant evaporating temperature is in the range of about 0 to about 10° C., while the condensing temperature is in the range of about 40 to about 70° C.

Operating Conditions:
1. Condensing temperature=46° C., Corresponding outdoor ambient temperature=35° C.
2. Condenser sub-cooling=5.5° C.
3. Evaporating temperature=4.5° C., Corresponding chilled leaving water temperature=7° C.
4. Evaporator Superheat=5.5° C.
5. Isentropic Efficiency=70%
6. Volumetric Efficiency=100%
7. Temperature Rise in Suction Line=2° C.

TABLE 4

Performance in Residential Heat pump System (Heating)

| Refrigerant | Heating Capacity (% R410A) | Heating Efficiency (% R410A) | Pressure ratio (% R410A) | Discharge Pressure (% R410A) | Discharge Temperature Difference (° C.) | Evap Glide (° C.) |
|---|---|---|---|---|---|---|
| R410A | 100% | 100% | 100% | 100% | 0 | 0.1 |
| A1 | 85% | 101% | 100% | 85% | 13.1 | 5.2 |
| A2 | 84% | 101% | 100% | 84% | 13.3 | 6.0 |
| A3 | 82% | 101% | 101% | 82% | 13.5 | 6.8 |

TABLE 5

Performance in Commercial Air-Conditioning System - Air-Cooled Chiller

| Refrigerant | Capacity (% R410A) | Efficiency (% R410A) | Pressure ratio (% R410A) | Discharge Pressure (% R410A) | Discharge Temperature Difference (° C.) | Evap Glide (° C.) |
|---|---|---|---|---|---|---|
| R410A | 100% | 100% | 100% | 100% | 0 | 0.1 |
| A1 | 89% | 102% | 100% | 85% | 12.8 | 5.2 |
| A2 | 87% | 102% | 100% | 84% | 13.0 | 5.9 |
| A3 | 85% | 102% | 101% | 82% | 13.2 | 6.7 |

Table 5 shows the thermodynamic performance of a commercial air-cooled chiller system compared to R410A system.

Composition A1 to A3 show 85% or higher capacity and matched efficiency compared to R410A. these data indicate the system performance is similar to R410A.

Composition A1 to A4 show 100% or 101% pressure ratio compared to R410A. It indicates the compressor efficiencies are similar to R410A, and no changes on R410A compressor are needed.

Composition A1 to A3 show evaporator glide less than 7° C.

Example 4

Residential Air-to-Water Heat Pump Hydronic System

Description:
Residential air-to-water heat pump hydronic systems are used to supply hot water (about 55° C.) to buildings for floor heating or similar applications in the winter. The hydronic system usually has a finned or microchannel evaporator to exchange heat with ambient air, a reciprocating, rotary or scroll compressor, a plate, tube-in-tube or shell-and-tube condenser to heat the water, and a thermal or electronic expansion valve. The refrigerant evaporating temperature is in the range of about −30 to about 5° C., while the condensing temperature is in the range of about 50 to about 90° C.

Operating Conditions:
1. Condensing temperature=60° C., Corresponding indoor leaving water temperature=50° C.
2. Condenser sub-cooling=5.5° C.
3. Evaporating temperature=0.5° C., Corresponding outdoor ambient temperature=8.3° C.
4. Evaporator Superheat=5.5° C.
5. Isentropic Efficiency=70%
6. Volumetric Efficiency=100%
7. Temperature Rise in Suction Line=2° C.

Table 6 shows the thermodynamic performance of a residential air-to-water heat pump hydronic system compared to R410A system.

Composition A1 to A3 show 85% or higher capacity and matched efficiency compared to R410A. These data indicate the system performance is similar to R410A.

Composition A1 to A3 show 100% to 102% pressure ratio compared to R410A. It indicates the compressor efficiencies are similar to R410A, and no changes on R410A compressor are needed.

Composition A1 to A3 show evaporator glide less than 7° C.

Example 5

Medium Temperature Refrigeration

Description:
Medium temperature refrigeration systems are used to chill food or beverages such as in a refrigerator and bottle cooler. The system usually has an air-to-refrigerant evaporator to chill the food or beverage, a reciprocating, scroll or screw compressor, an air-to-refrigerant condenser to exchange heat with the ambient air, and a thermal or electronic expansion valve. The refrigerant evaporating temperature is in the range of about −12 to about 0° C., while the condensing temperature is in the range of about 20 to about 70° C.

Operating Conditions:
1. Condensing temperature=40.6° C., Corresponding outdoor ambient temperature=35° C.
2. Condenser sub-cooling=5.5° C.
3. Evaporating temperature=−6.7° C., Corresponding box temperature=2° C.
4. Evaporator Superheat=5.5° C.
5. Isentropic Efficiency=70%
6. Volumetric Efficiency=100%
7. Temperature Rise in Suction Line=15° C.

TABLE 6

Performance in Residential Air-to-Water Heat Pump Hydronic System

| Refrigerant | Heating Capacity (% R410A) | Heating Efficiency (% R410A) | Pressure ratio (% R410A) | Discharge Pressure (% R410A) | Discharge Temperature Difference (° C.) | Evap Glide (° C.) |
|---|---|---|---|---|---|---|
| R410A | 100% | 100% | 100% | 100% | 0 | 0.1 |
| A1 | 90% | 103% | 100% | 85% | 17.4 | 4.9 |
| A2 | 88% | 103% | 101% | 83% | 17.5 | 5.6 |
| A3 | 86% | 103% | 101% | 82% | 17.5 | 6.4 |

TABLE 7

Performance in Medium Temperature Refrigeration System

| Refrigerant | Capacity (% R410A) | Efficiency (% R410A) | Pressure ratio (% R410A) | Discharge Pressure (% R410A) | Discharge Temperature Difference (° C.) | Evap Glide (° C.) |
|---|---|---|---|---|---|---|
| R410A | 100% | 100% | 100% | 100% | 0 | 0.1 |
| A1 | 89% | 102% | 100% | 85% | 16.5 | 5.2 |
| A2 | 87% | 102% | 100% | 84% | 16.5 | 6.0 |
| A3 | 86% | 102% | 101% | 82% | 16.6 | 6.9 |

Table 7 shows the thermodynamic performance of a medium temperature refrigeration system compared to R410A system.

Composition A1 to A3 show 85% or higher capacity and matched efficiency compared to R410A. These data indicate the system performance is similar to R410A.

Composition A1 to A3 show 100% or 101% pressure ratio compared to R410A. It indicates the compressor efficiencies are similar to R410A, and no changes on R410A compressor are needed.

Composition A1 to A3 show evaporator glide less than 7° C.

Example 6

Low Temperature Refrigeration

Description:

Low temperature refrigeration systems are used to freeze food such as in an ice cream machine and a freezer. The system usually has an air-to-refrigerant evaporator, a reciprocating, scroll or screw compressor, an air-to-refrigerant condenser to exchange heat with the ambient air, and a thermal or electronic expansion valve. The refrigerant evaporating temperature is in the range of about −40 to about −12° C., while the condensing temperature is in the range of about 20 to about 70° C.

Operating Conditions:
1. Condensing temperature=40.6° C., Corresponding outdoor ambient temperature=35° C.
2. Condenser sub-cooling=1° C.
3. Evaporating temperature=−31.6° C., Corresponding box temperature=−20.6° C.
4. Evaporator Superheat=5.5° C.
5. Isentropic Efficiency=70%
6. Volumetric Efficiency=100%
7. Temperature Rise in Suction Line=30° C.

TABLE 8

Performance in Low Temperature Refrigeration System

| Refrigerant | Capacity (% R410A) | Efficiency (% R410A) | Pressure ratio (% R410A) | Discharge Pressure (% R410A) | Discharge Temperature Difference (° C.) | Evap Glide (° C.) |
|---|---|---|---|---|---|---|
| R410A | 100% | 100% | 100% | 100% | 0 | 0.1 |
| A1 | 92% | 105% | 100% | 85% | 29.9 | 5.2 |
| A2 | 90% | 105% | 101% | 84% | 29.7 | 6.0 |
| A3 | 88% | 105% | 101% | 82% | 29.3 | 6.9 |

Table 8 shows the thermodynamic performance of a low temperature refrigeration system compared to R410A system.

Composition A1 to A3 show 85% or higher capacity and matched efficiency compared to R410A. These data indicate the system performance is similar to R410A.

Composition A1 to A3 show 100% to 102% pressure ratio compared to R410A. It indicates the compressor efficiencies are similar to R410A, and no changes on R410A compressor are needed.

Composition A1 to A3 show evaporator glide less than 7° C.

Example 7

Miscibility with POE

POE oil is widely used in air-conditioning and refrigeration systems.

As illustrated in FIG. 1, R410A is immiscible with POE oil below −22° C. R410A cannot therefore be used in low temperature refrigeration applications as POE oil will accumulate in the evaporator.

Furthermore, FIG. 1 demonstrates that R410A is immiscible with POE oil above 50°. This causes problems in the condenser and liquid line (e.g. the separated POE oil will be trapped and accumulated) when R410A is used in high ambient conditions.

Conversely, the refrigerants of the invention, that is, a refrigerant consisting essentially of or consisting of from about 34% by weight to about 38% by weight HFC-32, and from about 62% by weight to about 66% by weight of $CF_3I$, are fully miscible with POE oil across a temperature range of −50° C. to 70° C. This is demonstrated in FIG. 2, which shows that compositions having a mass fraction of greater than 60% $CF_3I$, relative to the total amount of HFC-32 and $CF_3I$ are fully miscible across the temperature range of −50° C. to 70° C. with POE.

Although the invention has been described with reference to preferred embodiments, it will be understood by those skilled in the art that various changes may be made and equivalents substituted for elements thereof without departing from the scope of the invention. In addition, many modifications may be made to adapt to a particular situation or material to the teachings of the invention with departing from the essential scope thereof. Therefore, it is intended that the invention not be limited to the particular embodiments disclosed, but that the invention will include all embodiments falling within the scope of the appended claims or any claims added later.

EXAMPLES

R32/CF3I/CO2

The R-32/CF3I/CO2 ternary refrigerant compositions identified in Table 9 below were determined as described herein. Each composition was subjected to thermodynamic analysis to determine its ability to match the operating characteristics of R-4104A in various refrigeration systems. The analysis was performed using experimental data collected for properties of various binary pairs of components used in the composition. The composition of each binary pair was varied over a series of relative percentages in the experimental evaluation and the mixture parameters for each binary pair were regressed to the experimentally obtained data. The assumptions used to conduct the analysis were the following: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 9

Refrigerant evaluated for Performance Examples

| Refrigerant | R32 (wt %) | CF3I (wt %) | CO2 (wt %) |
|---|---|---|---|
| B1 | 35 | 62 | 3 |
| B2 | 36 | 61 | 3 |
| B3 | 37 | 60 | 3 |
| B4 | 38 | 59 | 3 |
| B5 | 39 | 58 | 3 |
| B6 | 40 | 57 | 3 |
| B7 | 42 | 55 | 3 |
| B8 | 44 | 53 | 3 |
| B9 | 46 | 51 | 3 |

TABLE 10

Determination of Evaporator Glide

| Refrigerant | R32 (wt %) | CF3I (wt %) | CO2 (wt %) | Evap. Glide (° C.) |
|---|---|---|---|---|
| B2 | 36 | 61 | 3 | 7.6 |
| B3 | 37 | 60 | 3 | 7.2 |
| B4 | 38 | 59 | 3 | 6.8 |
| B6 | 40 | 57 | 3 | 6.1 |
| B7 | 42 | 55 | 3 | 5.4 |
| B8 | 44 | 53 | 3 | 4.8 |
| B9 | 46 | 51 | 3 | 4.3 |

Refrigerant blends having an evaporator glide of 7 C or less are highly desirable. Accordingly, for refrigerants of the present invention in which CO2 is present in an amount of about 3%, applicants have determined that it is generally preferred that the refrigerant includes 38% of R-32 or less.

Example 8

Residential Air-Conditioning System (Cooling) with TXV—0% and 1% CO2

Residential air-conditioning systems are used to supply cool air (about 12° C.) to buildings in the summer. Typical system types are ducted split, ductless split, window and portable air-conditioning system. The system usually has an air-to-refrigerant evaporator (indoor coil), a compressor, an air-to-refrigerant condenser (outdoor coil), and an expansion device. The evaporator and condenser are usually finned tube or microchannel heat exchangers. The compressor is usually reciprocating, rotary (rolling-piston or rotary vane) or scroll compressor. The expansion device is usually a capillary tube, a thermal or electronic expansion valve. The refrigerant evaporating temperature is in the range of about 0 to about 10° C., while the condensing temperature is in the range of about 40 to about 70° C. In the present example, the system includes a thermal expansion valve (TXV).

Operating Conditions:
Condensing temperature=46° C.
Condenser sub-cooling=5.5° C.
Evaporating temperature=7° C.
Evaporator Superheat=5.5° C.
Isentropic Efficiency=70%
Volumetric Efficiency=100%
Temperature Rise in Suction Line=5.5° C.

Refrigerants comprising 38% R32 and 62% CF3I (no CO2) and 38% R32, 61% CF3I and 1% CO2 was formulated and was found to produce the results as indicated in Table 13 below:

TABLE 13

| R32 (wt %) | CO2 (wt %) | CF3I (wt %) | Thermo Capacity (% R410A) | Thermo COP (% R410A) | Capacity (% R410A) | COP (% R410A) | Power (% R410A) | Evap. Glide (° C.) |
|---|---|---|---|---|---|---|---|---|
| 38 | 0 | 62 | 90% | 102% | 91% | 103% | 89% | 5.5 |
| 38 | 1 | 61 | 92% | 102% | 94% | 101% | 93% | 6.0 |

As can be seen from the results above, the formulation that consists of 38% R32 and 62% CF3I and the formulation that consists of 38% R32 and 61% CF3I and 1% CO2 achieves an actual capacity and actual efficiency that is close to the values estimated based on applicant's thermodynamic data and test work. As can be seen, the estimates indicate that while capacity will increase with the addition of CO2, there is no change in the estimated efficiency as CO2 is added.

The estimation work is repeated, except that a formulation consisting of 38% of R32, 7% CO2, and 55% of CF3I is studied. The results are reported in Table 14 below:

TABLE 14

| R32 (wt %) | CO2 (wt %) | CF3I (wt %) | Thermo Capacity (% R410A) | Thermo COP (% R410A) |
|---|---|---|---|---|
| 38 | 7 | 55 | 1.07% | 99% |

As can be seen from the results above, increasing the level of CO2 to 7% while maintaining the amount of R32 at about 38% produces an expected increase in capacity and continues to provide the expectation that efficiency (COP) will remain substantially unchanged. This result would lead to an expected substantial advantage in power consumption by the use of formulations containing about 38% of R32 but with levels of 7% of CO2 or greater compared to formulations containing less than 7%.

Example 9

Residential Air-Conditioning System (Cooling)—with TXV CO2 From 3%-5%

Description:

The same residential air-conditioning system tested in accordance with Example 8 is used to test refrigerant compositions of the present invention comprising 38% of R-32 as identified in Table 15 below.

TABLE 15

| Refrigerant | R32 (wt %) | CF3I (wt %) | CO2 (wt %) |
|---|---|---|---|
| B4 | 38 | 59 | 3 |
| B4A | 38 | 58.5 | 3.5 |
| B4B | 38 | 57 | 5 |

Based on the estimation work done by applicants, it would have been expected that operating efficiency (COP) of the formulation in Table 15 would have been about the same as the estimated COPs of the formulation in Example 8, including the formulation containing about 7% CO2. The efrigerants of Table 15 were found to produce the expected results based on thermodynamic simulation and actual results indicated in Table 16 below:

TABLE 16

Performance in Residential Air-Conditioning System (Cooling)

| Refrigerant | Est. Capacity (% R410A) | Est. Efficiency (% R410A) | Actual Capacity (% R410A) | Actual COP (% R410A) | Actual Power Consumtion (% R410A) | Evap Glide (° C.) |
|---|---|---|---|---|---|---|
| R410A | 100% | 100% | 100% | 100% | 0 | 0.1 |
| B4 | 97% | 101% | 97% | 98% | 98% | 6.8 |
| B4A | 99% | 101% | 98% | 98% | 100% | 7.0 |
| B4B | 102% | 100% | 100% | 96% | 104% | 7.6 |

Table 16 shows the thermodynamic (estimate) performance of a residential air conditioning system compared to the R410A system, and this table reveals that while actual and estimated capacity remain in relatively close agreement for these formulations, there begins to appear an unexpected fall-off in efficiency as the concentration of CO2 increases above 3.5% (B4A), and this fall-off becomes even more pronounced and unexpected as the level of CO2 approaches 5% (showing a COP of only 96% for 5% CO2). These results also show a commercially significant, important and unexpected advantage to operation (including in power consumption of 104% or less) for refrigerants that comprise, and consist essentially or and consist of from 3% to less than 5% of CO2, from 57% to 59% of CF3I and about 38% of R-32. These results also show a commercially significant, important and unexpected advantage to operation (including in power consumption of 100% or less) for refrigerants that comprise, and consist essentially or and consist of from 3% to about 3.5% CO2, from 58.5% to about 59% of CF3I and about 38% of R-32.

Example 10

Residential Air-Conditioning System (Cooling)—with TXV CO2 at 7%

Example 8 is repeated to produce actual results using the refrigerant formulation as indicated in Table 17 below, producing the results as reported in the table, with the estimated results reported from Example 8 being repeated for convenience:

TABLE 17

| R32 (wt %) | CO2 (wt %) | CF3I (wt %) | Thermo Capacity (% R410A) | Thermo COP (% R410A) | Capacity (% R410A) | COP (% R410A) | Power (% R410A) | Evap. Glide (° C.) |
|---|---|---|---|---|---|---|---|---|
| 38 | 7 | 55 | 107% | 99% | 102% | 93% | 109% | 8.2 |

As can be seen from the results above, a formulation that includes about 38% R32 but with an increased CO2 level of 7% unexpectedly produces a substantial and unwanted increase in power consumption for the system because the unexpected but significant drop-off in efficiency that occurs with CO2 levels above 5%.

The results of this testing showing the unexpected results is summarized in FIG. 3 hereof.

Example 11

Residential Air-Conditioning System (Cooling)—Capillary Tube and 0% and 1% CO2

A residential air-conditioning system as described in Example 8 is used, except that the system includes a capillary tube instead of a thermal expansion valve (TXV) and the operating conditions are as follows:

Condensing temperature=48° C.
Condenser sub-cooling=5.5° C.
Evaporating temperature=11° C.
Evaporator Superheat=4.5° C.
Isentropic Efficiency=70%
Volumetric Efficiency=100%
Temperature Rise in Suction Line=5.5° C.

Refrigerants comprising 38% R32 and 62% CF3I (no CO2) and 38% R32, 61% CF3I and 1% CO2 were formulated and were found to produce the results as indicated in Table 18 below:

TABLE 18

| R32 (wt %) | CO2 (wt %) | CF3I (wt %) | Thermo Capacity (% R410A) | Thermo COP (% R410A) | Capacity (% R410A) | COP (% R410A) | Power (% R410A) | Evap. Glide (° C.) |
|---|---|---|---|---|---|---|---|---|
| 38 | 0 | 62 | 90% | 102% | 92% | 102% | 91% | 5.5 |
| 38 | 1 | 61 | 92% | 102% | 94% | 100% | 94% | 6.0 |

As can be seen from the results above, the formulation that consists of 38% R32 and 62% CF3I and the formulation that consists of 38% R32 and 61% CF3I and 1% CO2 achieves an actual capacity and actual efficiency that is close to the values estimated based on applicant's thermodynamic data and test work. As can be seen, the estimates indicate that while capacity will increase with the addition of CO2, there is no change in the estimated efficiency as CO2 is added.

The estimation work is repeated, except that a formulation consisting of 38% of R32, 7% CO2, and 55% of CF3I is studied. The results are reported in Table 19 below:

TABLE 19

| R32 (wt %) | CO2 (wt %) | CF3I (wt %) | Thermo Capacity (% R410A) | Thermo COP (% R410A) |
|---|---|---|---|---|
| 38 | 7 | 55 | 107% | 99% |

As can be seen from the results above, increasing the level of CO2 to 7% while maintaining the amount of R32 at about 38% produces an expected increase in capacity and continues to provide the expectation that efficiency (COP) will remain substantially unchanged. This result would lead to an expected substantial advantage in power consumption by the use of formulations containing about 38% of R32 but with levels of 7% of CO2 or greater compared to formulations containing less than 7%.

Example 12

Residential Air-Conditioning System (Cooling)—Capillary Tube and CO2 from 3%-5%

Description:

The same residential air-conditioning system tested in accordance with Example 11 is used to test refrigerant compositions of the present invention comprising 38% of R-32 as identified in Table 20 below.

TABLE 20

| Refrigerant | R32 (wt %) | CF3I (wt %) | CO2 (wt %) |
|---|---|---|---|
| B4 | 38 | 59 | 3 |
| B4A | 38 | 58.5 | 3.5 |
| B4B | 38 | 57 | 5 |

Based on the estimation work done by applicants, it would have been expected that operating efficiency (COP) of the formulation in Table 20 would have been about the same as the estimated COPs of the formulation in Example 11, including the formulation containing about 7% CO2. The refrigerants of Table 20 were found to produce the expected results based on thermodynamic simulation and actual results indicated in Table 21 below:

TABLE 21

| | Performance in Residential Air-Conditioning System (Cooling) | | | | | |
|---|---|---|---|---|---|---|
| Refrigerant | Est. Capacity (% R410A) | Est. Efficiency (% R410A | Actual Capacity (% R410A) | Actual COP (% R410A) | Actual Power Consumtion (% R410A) | Evap Glide (° C.) |
| R410A | 100% | 100% | 100% | 100% | 0 | 0.1 |
| B4 | 97% | 101% | 97% | 97% | 100% | 6.8 |
| B4A | 99% | 101% | 98% | 98% | 100% | 7.0 |
| B4B | 102% | 100% | 100% | 95% | 105% | 7.6 |

Table 21 shows the thermodynamic (estimate) performance of a residential air conditioning system using a capillary tube compared to the R410A system, and this table reveals that while actual and estimated capacity remain in relatively close agreement for these formulations, there begins to appear an unexpected fall-off in efficiency as the concentration of CO2 increases above 3.5% (B4A), and this fall-off becomes even more pronounced and unexpected as the level of CO2 approaches 5% (showing a COP of only 95% for 5% CO2). This is a commercially significant, important and unexpected fall-off in efficiency and which forms, in part, the basis for applicants discovery of unexpected advantage (including in power consumption of about 105% or less) for refrigerants that comprise, and consist essentially or and consist of from 3% to less than 5% of CO2, from 57% to 59% of CF3I and about 38% of R-32. These results also show a commercially significant, important and unexpected advantage to operation (including in power consumption of 100% or less) for refrigerants that comprise, and consist essentially or and consist of from 3% to about 3.5% CO2, from 58.5% to about 59% of CF3I and about 38% of R-32. Each of these preferred composition ranges include compositons that are non-flammable and have a highly desirable GWP of less than 400.

Example 13

Residential Air-Conditioning System (Cooling)—CO2 at 7%

Example 10 is repeated to produce actual results using the refrigerant formulation as indicated in Table 17 below, producing the results as reported in the table, with the estimated results reported from Example 10 being repeated for convenience:

TABLE 17

| R32 (wt %) | CO2 (wt %) | CF3I (wt %) | Thermo Capacity (% R410A) | Thermo COP (% R410A) | Capacity (% R410A) | COP (% R410A) | Power (% R410A) | Evap. Glide (° C.) |
|---|---|---|---|---|---|---|---|---|
| 38 | 7 | 55 | 107% | 99% | 102% | 93% | 109% | 8.2 |

As can be seen from the results above, a formulation that includes about 38% R32 but with an increased CO2 level of 7% unexpectedly produces a substantial and unwanted increase in power consumption for the system because the unexpected but significant drop-off in efficiency that occurs with CO2 levels above 5%.

The results of this testing showing the unexpected results is summarized in FIG. 4 hereof.

The invention claimed is:

1. A refrigerant consisting essentially of:
about 38% by weight difluoromethane (HFC-32),
from 57% to 59% by weight trifluoroiodomethane (CF3I); and
from 2% to 5% by weight of CO2.

2. The refrigerant of claim 1 wherein the refrigerant in non-flammable.

3. The refrigerant of claim 1 consisting of:
about 38% by weight difluoromethane (HFC-32),
from 57% to 59% by weight trifluoroiodomethane (CF3I); and
from 2% to 5% by weight of CO2.

4. The refrigerant of claim 3 wherein the refrigerant in non-flammable.

5. The refrigerant of claim 1 consisting essentially of:
about 38% by weight difluoromethane (HFC-32),
from 58%+/−0.5% to 59%+/−0.5% by weight trifluoroiodomethane (CF3I); and
from 2% to 3.5% by weight of CO2.

6. The refrigerant of claim 1 consisting of:
about 38% by weight difluoromethane (HFC-32),
from 58%+/−0.5% to 59%+/−0.5% by weight trifluoroiodomethane (CF3I); and
from 2% to 3.5% by weight of CO2.

7. The refrigerant of claim 1 consisting essentially of:
38%+/−0.5% by weight difluoromethane (HFC-32),
59%+/−0.5% by weight trifluoroiodomethane (CF3I); and
3%+/−0.5% by weight of CO2.

8. The refrigerant of claim 1 consisting of:
38%+/−0.5% by weight difluoromethane (HFC-32),
59%+/−0.5% by weight trifluoroiodomethane (CF3I); and
3%+/−0.5% by weight of CO2.

9. A method of cooling in a heat transfer system comprising an evaporator, a condenser and a compressor, the process comprising the steps of i) condensing a refrigerant of claim 1 and ii) evaporating said refrigerant in the vicinity of body or article to be cooled, wherein said refrigerant evaporates at a temperature of in the range of from about −40° C. to about −10° C.

10. A method of cooling in a heat transfer system comprising an evaporator, a condenser and a compressor, the process comprising the steps of i) condensing a refrigerant of claim 1 and ii) evaporating said refrigerant in the vicinity of body or article to be cooled, wherein said refrigerant evaporates at a temperature of in the range of from about −30° C. to about 5° C.

11. The method of claim 9 wherein the heat transfer system is an air conditioning system.

12. The method of claim 11 wherein the air conditioning system is a residential air-conditioning system with an evaporator temperature in the range of about 0 to about 10° C.

13. The method of claim 12 wherein said residential air conditioning system comprises a reciprocating, rotary (rolling piston or rotary valve) or scroll compressor.

14. A method of replacing an existing refrigerant contained in a heat transfer system comprising removing at least a portion of said existing refrigerant from said system, said existing refrigerant being R-410A and replacing at least a portion of said existing refrigerant by introducing into said system a refrigerant as claimed in claim 1.

15. A refrigerant consisting essentially of from about 34% to about 38% by weight of HFC-32, and fom about 62% to about 66% by weight of $CF_3I$.

16. The refrigerant of claim 15 which consists essentially of about 36% by weight of HFC-32 and about 64% by weight of $CF_3I$.

17. The refrigerant of claim 15 consisting essentially of about 38% by weight of HFC-32 and about 62% by weight of $CF_3I$.

18. A heat transfer composition comprising a refrigerant as defined in claims 1 and a lubricant and/or at least one stabiliser.

19. The heat transfer composition of claim 18 comprising polyol ester (POE) lubricant.

20. The heat transfer composition of claim 1 comprising polyol ester (POE) lubricant.

\* \* \* \* \*